US011994928B1

(12) United States Patent
Alameh et al.

(10) Patent No.: US 11,994,928 B1
(45) Date of Patent: May 28, 2024

(54) APPARATUS WITH PRESENCE DETECTION SENSORS

(71) Applicant: Amazon Technologies, Inc., Seattle, WA (US)

(72) Inventors: Rachid M Alameh, Crystal Lake, IL (US); Andre David Brown, Issaquah, WA (US); Gopi Prashanth Gopal, Redmond, WA (US); Stephen Ernest O'Dea, Bedford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/224,754

(22) Filed: Apr. 7, 2021

(51) Int. Cl.

| | |
|---|---|
| ***G06F 1/3231*** | (2019.01) |
| ***B62B 5/00*** | (2006.01) |
| ***G01D 5/24*** | (2006.01) |

(52) U.S. Cl.
CPC .............. *G06F 1/3231* (2013.01); *B62B 5/00* (2013.01); *G01D 5/24* (2013.01)

(58) Field of Classification Search
CPC ..... G06F 1/00; G06F 1/26; G06F 1/32; G06F 1/3203; G06F 1/3206; G06F 1/3231; B62B 5/00; G01D 5/00; G01D 5/12; G01D 5/14; G01D 5/24
USPC ......................................... 324/649, 658, 686
See application file for complete search history.

(56) References Cited

U.S. PATENT DOCUMENTS

| | | | | |
|---|---|---|---|---|
| 9,117,106 B2 | | 8/2015 | Dedeoglu et al. | |
| 9,209,803 B2 | * | 12/2015 | Bruwer | H03K 17/962 |
| 9,235,928 B2 | | 1/2016 | Medioni et al. | |
| 9,473,747 B2 | | 10/2016 | Kobres et al. | |
| 10,179,598 B1 | * | 1/2019 | Goodbinder | H05K 5/0234 |
| 2013/0284806 A1 | | 10/2013 | Margalit | |
| 2017/0225701 A1 | * | 8/2017 | Kraus | B62B 5/0457 |
| 2017/0229903 A1 | * | 8/2017 | Jones | H02K 7/1846 |
| 2022/0203007 A1 | * | 6/2022 | Yuds | A61L 2/10 |

FOREIGN PATENT DOCUMENTS

| | | | | |
|---|---|---|---|---|
| ES | 2662696 B1 | * | 10/2018 | G06K 7/10356 |

* cited by examiner

*Primary Examiner* — Hoai-An D. Nguyen
(74) *Attorney, Agent, or Firm* — Lee & Hayes P.C.; Russell Wagstaff

(57) ABSTRACT

This disclosure describes, in part, a mobile apparatus that includes capacitive sensor(s) for detecting the presence of a user. For instance, the mobile apparatus, such as a shopping cart, may include capacitive sensor(s) located proximate to a main frame, the handles, and/or the wheel frame. The mobile apparatus may use one or more of these capacitive sensor(s) to determine that the user is located proximate to the mobile apparatus, in contact with the mobile apparatus, and/or located over the main frame of the mobile apparatus. In some examples, the mobile apparatus may then perform one or more actions based on the presence of the user. For example, the mobile apparatus may activate and/or deactivate one or more devices based on the presence of the user. This way, the mobile apparatus is able to conserve power by using the capacitive sensor(s) to detect the present of the user.

22 Claims, 16 Drawing Sheets

APPARATUS WITH PRESENCE DETECTION SENSORS

BACKGROUND

Retail stores maintain an inventory of items in customer-accessible areas such that customers can pick items from the inventory for purchase, rental, and so forth. For example, a customer may take items from shelves located within the store and place the items in a shopping cart. When the customer is finished identifying and retrieving the items, the customer may transport the items, using the shopping cart, to a check-out destination within the store, such as a cashier or dedicated self-checkout stand. In some circumstances, the shopping cart may include sensors, such as cameras, that are configured to determine the items that are placed into the shopping cart by the customer. In these circumstances, the shopping cart may require an internal power source, such as one or more batteries, to power these sensors. However, this may cause problems, such as maintaining enough power in the internal power source to keep the shopping cart operating as intended for a period of time.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
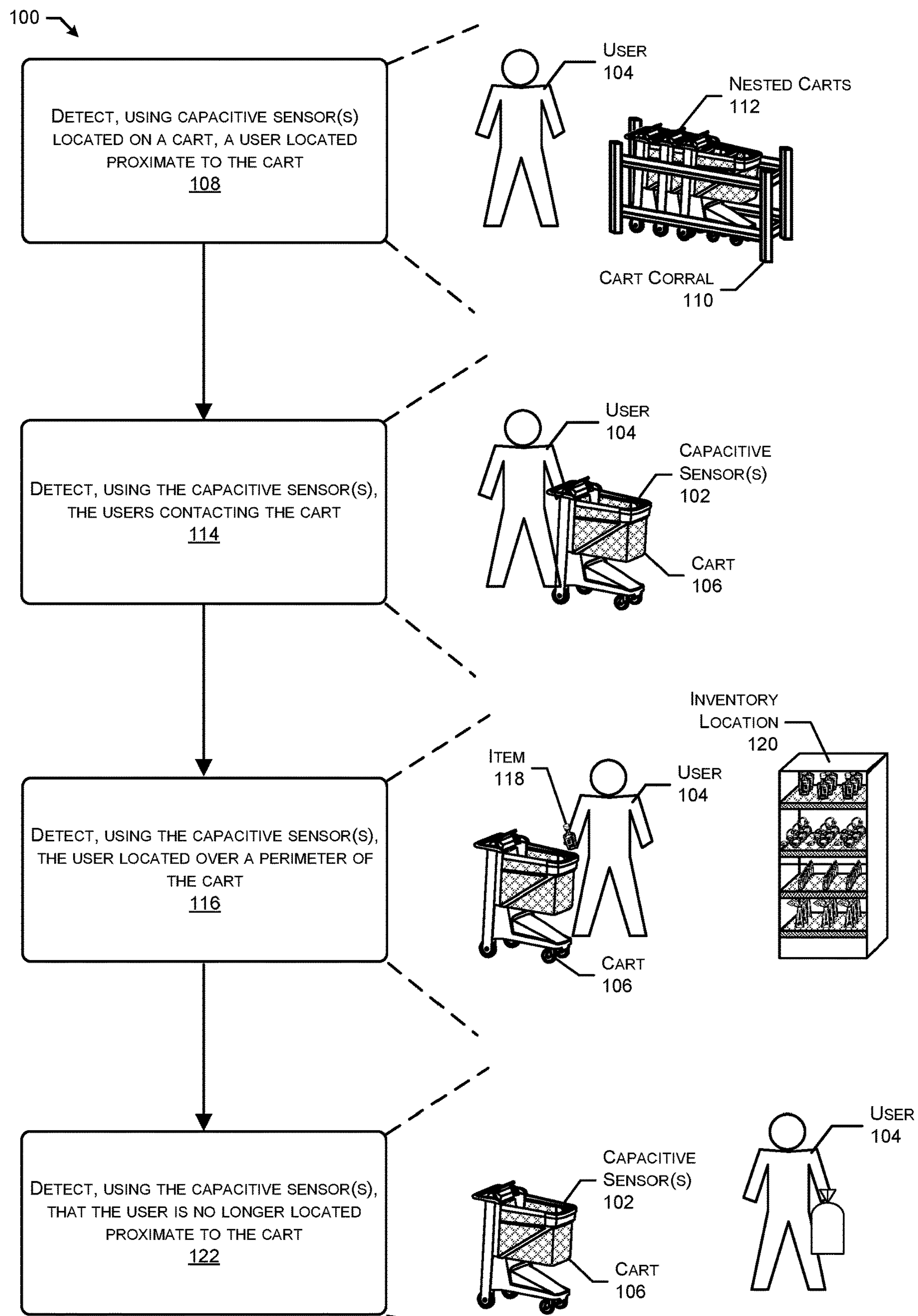
FIG. 1 illustrates an example process for using capacitive sensor(s) to detect a presence of a user around a cart, in accordance with examples of the present disclosure.

This disclosure describes, in part, apparatuses that use capacitive sensors to detect the presence of users. For instance, an apparatus, such as a shopping cart, an inventory location, and/or any other type of apparatus, may include one or more capacitive sensors that the apparatus uses to detect the presence of a user. For example, if the apparatus is a shopping cart, the shopping cart may use the one or more capacitive sensors to determine that the user is located proximate to the shopping cart, located over a portion of the shopping cart, in contact with the shopping cart, and/or the like. Additionally, if the apparatus is an inventory location, the inventory location may use the one or more capacitive sensors to determine if the user is proximate to the inventory location, removing item(s) from the inventory location, replacing item(s) at the inventory location, and/or the like. In some instances, the apparatus may use these determinations for performing one or more actions. For example, and again if the apparatus includes the shopping cart, the shopping cart may activate device(s), such as a display or camera(s), when the shopping cart detects the user proximate to the shopping cart and/or in contact with a portion of the shopping cart. This way, the apparatus is able to conserve power by only activating these device(s) at times when the apparatus is being used by the user.

For more detail, the apparatus may include, but is not limited to, a shopping cart (referred to as just a "cart" in some examples), a tote, an inventory location (e.g., a shelf, a bin, a table, a refrigerator, etc.), and/or any other type of apparatus which may hold items for users. In examples where the apparatus includes the cart, the cart may include at least a frame that includes, or supports, a basket comprising a bottom having a quadrilateral shape, four sides protruding from the bottom to define an interior cavity, and a top having a perimeter that defines an opening to receive the items placed within the interior cavity of the basket. Additionally, the frame may include, or support, a perimeter that wraps at least partially around the perimeter of the basket, a handle that the user uses to move the cart, and a wheel frame that supports one or more wheel castors that enable the movement of the cart. While these are just a couple example components of the cart, in other examples, the cart may include additional and/or alternative components.

The cart may include one or more capacitive sensors located at various location(s) on the cart. For a first example, the cart may include a capacitive sensor that is disposed on the insulation of the frame (e.g., powdered insulation, the insulation that is around the metal of the frame). In such an example, a majority of the frame of the cart, which includes portions of the frame for which the capacitive sensor is not located, may still be energized and act like the capacitive sensor. The frame can also be directly connected to senor by removing the powered insulation such as using a bolt/screw. For a second example, the cart may include a capacitive sensor that is disposed on at least a portion of the frame, where a driven shield is located between the capacitive sensor and the frame. By using the driven shield, only the portion of the frame that includes the capacitive sensor may be energized. The driven shield allows the sensor to be placed over a grounded area and prevent ground from capacitively shorting the sensor. Still, for a third example, the cart may include multiple capacitive sensors that are disposed at various portions of the cart (e.g., first capacitive sensor(s) disposed at a first side of the frame and second capacitive sensor(s) disposed at a second side of the frame).

In either of the examples above, the cart may also include one or more grounds associated with the capacitive sensor(s) in order to control the electric field(s) of the capacitive sensor(s). For a first example, the capacitive sensor may be located proximate to a first surface of the frame (e.g., a top surface of the frame) and ground material may be located proximate to a second, opposite surface of the frame (e.g., a bottom surface of the frame). For a second example, the cart may include capacitive sensor(s) and ground material that alternates along the frame. Details about the locations of the capacitive sensor(s) and the ground(s) are described in more detail with regard to FIGS. 2-4. FIG. 1 should show a user touching frame/leaning against cart body or placing foot on bottom shelf/standing The cart (e.g., a computing device (and/or processor(s) associated with the cart) may then use the capacitive sensor(s) to detect the presence of the user. For a first example of detecting the presence of the user, the cart may receive sensor data generated by the capacitive sensor(s). The cart may then analyze the sensor data to determine a capacitance detected by the capacitive sensor(s). Next, the cart may compare the capacitance to a first threshold capacitance to determine whether the capacitance satisfies (e.g., is greater to or less than) the first threshold capacitance or does not satisfy (e.g., is less than) the first threshold capacitance. The cart may then determine that the user is located proximate to the cart when the capacitance satisfies the first threshold capacitance or determine that the user is not located proximate to the cart when the capacitance does not satisfy the first threshold capacitance. As described herein, the user may be located proximate to the cart when the user is located within a threshold distance from the cart. The threshold distanced may include, but is not limited to, one foot, two feet, three feet, five feet, and/or any other distance.

For a second example of detecting the presence of the user, the cart may again receive the sensor data generated by the capacitive sensor(s). The cart may then analyze the sensor data to determine the capacitance detected by the capacitive sensor(s) as well as detecting capacitance profile (rate of change, approach, depart). Rate of change could be machine learned to determine valid from invalid detections. Next, the cart may compare the capacitance to a second threshold capacitance to determine whether the capacitance satisfies (e.g., is greater to or less than) the second threshold capacitance or does not satisfy (e.g., is less than) the second threshold capacitance. The cart may then determine that the user is in contact with the cart (e.g., touching the frame of the cart) when the capacitance satisfies the second threshold capacitance or determine that the user is not in contact with the cart when the capacitance does not satisfy the second threshold capacitance. In these first two examples, the second threshold capacitance may be greater than the first threshold capacitance.

For a third example of detecting the presence of the user, such as when the cart includes first capacitive sensor(s) located at a first portion of the frame and second capacitive sensor(s) located at a second portion of the frame, the cart may receive first sensor data from the first capacitive sensor(s) and second sensor data from the second capacitive sensor(s). The cart may then analyze the first sensor data to determine a first capacitance detected by the first capacitive sensor(s) and analyze the second sensor data to determine a second capacitance detected by the second capacitive sensor(s). Additionally, the cart may compare the first capacitance and the second capacitance to a third threshold capacitance to determine whether the first capacitance and/or the second capacitance satisfy (e.g., are greater to or less than) the third threshold capacitance or do not satisfy (e.g., are less than) the third threshold capacitance.

Based on determining that both the first capacitance and the second capacitance satisfy the third threshold capacitance, the cart may determine that both the first capacitive sensor(s) and the second capacitance sensor(s) detected the presence of the user at the same time. As such, and such as when the first capacitive sensor(s) are located on an opposite side of the perimeter of the frame than the second capacitive sensor(s), the cart may determine that the user is located over the perimeter of the cart and/or within the interior cavity of the basket. In this example, the third threshold capacitance may be different than the first threshold capacitance and the second threshold capacitance or the third threshold capacitance may be the same as one of the first threshold capacitance or the second threshold capacitance. For this to happen each capacitance must have a range covering the width of cart.

In the examples above, and as described herein, a threshold capacitance may include, but is not limited to, 0 farads, 1 farad, 5 farads, and/or any other capacitance value. For instance, the first threshold capacitance and/or the third threshold capacitance may include 0 farads when the cart "zeroes out" other capacitance(s), which is described in more detail below. Additionally, the second threshold capacitance may be greater than the first threshold capacitance and/or the third threshold capacitance since the capacitive sensor(s) may detect a higher capacitance when the user is touching the frame than when the user is only proximate to the frame.

Still, for a fourth example of detecting the presence of the user, the cart may receive first sensor data generated by the capacitive sensor(s) at a first time and second sensor data generated by the capacitive sensor(s) at a second, later time. The cart may then analyze the first sensor data to determine a first capacitance detected by the capacitive sensor(s) at the first time and analyze the second sensor data to determine a second capacitance detected by the capacitive sensor(s) at the second time. The cart may then use the first capacitance and the second capacitance to determine a direction at which the user is moving. For instance, the cart may determine that the user is moving towards the cart when the second capacitance is greater than the first capacitance or determine that the user is moving away from the cart when the second capacitance is less than the first capacitance. While these are just a few example techniques of how the cart may use the capacitive sensor(s) to detect the presence of the user, in other examples, the cart may use additional and/or alternative techniques to detect the presence of the user using the capacitive sensor(s).

In some examples, the cart may perform one or more actions based on whether the user is located proximate to the cart, the user is in contact with the cart, the user is located over the perimeter of the cart, the user is pushing cart via handle bar, and/or the direction that the user is moving. The one or more actions may include, but are not limited to, activating one or more devices associated with the cart, deactivating one or more devices associated with the cart, causing a device (e.g., a display) to present content, and/or any other action ort causing communication from cart over wifi for example. As described herein, a device of the cart may include, but is not limited to, an imaging device (e.g., a camera), a display, a sensor (e.g., a motion sensor, a weight sensor, an accelerometer, a location sensor, a Time of Flight (ToF) sensor, etc.), a microphone, a speaker, a lighting device, processors, AI engine, and/or any other type of device.

For a first example, the cart may use the capacitive sensor(s) to determine that a user is located proximate to the cart. Based on the determination, the cart may cause a display to activate (e.g., provide power to the display such that the display turns on). For a second example, the cart may use the capacitive sensor(s) to determine that the user is located over the perimeter of the cart (top or bottom). Based on the determination, the cart may cause weight sensor(s) associated with the bottom of the basket to temporarily deactivate (e.g., cease providing power to the weight sensor(s) such that the weight sensor(s) turns off or keep power but disable output). In this example, the cart may cause the weight sensor(s) to deactivate until the cart determines, using the capacitive sensors), that the user is no longer located over the perimeter of the cart. This way, the weight sensor(s) do not use the weight of the user when determining the total weight within the basket.

For a third example, the cart may again use the capacitive sensor(s) to determine that the user is located over the perimeter of the cart. Based on the determination, the cart may cause imaging device(s) associated with the interior cavity of the basket to activate (e.g., provide power to the imaging device(s) such that the imaging device(s) turn on for item scanning). Still for a fourth example, the cart may use the capacitive sensor(s) to determine that the user is no longer located proximate to the cart and/or moving away from the cart. Based on the determination(s), the cart may cause the display to deactivate (e.g., cease providing power to the display such that the display turns off) or go into low power mode to extend battery operational time. When determining that the user is no longer located proximate to the cart, the cart may further determine that the user is no longer located proximate to the cart for a threshold period of time, such as five seconds, thirty seconds, one minute, and/or any other period of time. While these are just a couple examples of actions that may be performed by the cart based on detecting the presence of the user using the capacitive sensor(s), in other examples, the cart may perform additional and/or alternative actions.

In some examples, the cart may use additional sensor data from one or more other sensors when determining which action(s) to perform. For example, the cart may receive sensor data generated by accelerometer(s). The cart may then analyze the sensor data to determine a velocity of the cart, an acceleration of the cart, a direction at which the cart is moving, and/or any other motion information. The cart may then determine one or more actions to perform based on the presence of the user and the motion of the cart. In this case, capacitive and IMU sensors work together for as smarted system. Both sensors are micropower.

For a first example, the cart may determine that the user is touching the cart and that the cart is moving at a walking velocity (e.g., 4 miles per hour). Based on these determination(s), the cart may deactivate the display or reduce the brightness of the display since the user is less likely to engage the display when the cart is moving at that velocity. For a second example, the cart may determine that the user is again touching the cart and that the cart is moving at any velocity (e.g., at least 1 mile per hour). Based on these determination(s), the cart may deactivate the weight sensor(s) associated with the bottom of the basket since it is less likely that the user is placing new item(s) in the cart while the cart is moving especial when cart is moving at a good speed. Still, for a third example, the cart may determine that the user was recently proximate to the cart and that the cart is no longer moving. Based on these determination (s), the cart may activate the imaging device(s) since the user is likely searching for item(s) that will be placed within the basket. While these are just a couple examples of actions that may be performed by the cart based on detecting the presence of the user using the capacitive sensor(s) and the motion of the cart using the accelerometer(s), in other examples, the cart may perform additional and/or alternative actions.

While the examples above describe the apparatus as including the cart, in other examples, the apparatus may include another type of apparatus, such as an inventory location. For instance, the inventory location may include at least a bottom surface, one or more sides protruding from the bottom surface, a top surface that attaches to the one or more sides, and an opening that is created by the bottom surface, the side(s), and/or the top surface. The inventory location may further include one or more capacitive sensors. For a first example, the inventory location may include capacitive sensor(s) located on the bottom surface. For a second example, the inventory location may include first capacitive sensor(s) located on the bottom surface and second capacitive sensor(s) located on one or more of the side(s). Still, for a third example, the inventory location may include capacitive sensor(s) located on the top surface while the ground on the bottom (preferred implementation to prevent capacitive saturation). While these are just a couple examples of where the capacitive sensor(s) may be located on the inventory location, in other examples, the capacitive sensor(s) may be located on any other location of the inventory location.

The inventory location may further include a ground material that is associated with the capacitive sensor(s). For a first example, such as when the capacitive sensor(s) are located on the bottom surface of the inventory location, the ground material may be located at the top surface of the inventory location. For a second example, such as when the capacitive sensor(s) are located at a first side of the inventory location, the ground material may be located at a second, opposite side of the inventory location. Still, for a third example, such as when the capacitive sensor(s) are located at the top surface of the inventory location, the ground material may be located at the bottom surface of the inventory location. While these are just a couple examples of where the ground material may be located on the inventory location, in other examples, the ground material may be located on any other location of the inventory location.

The inventory location (e.g., a computing device and/or processor(s) associated with the inventory location) may then use the capacitive sensor(s) to detect one or more events. As described herein, the one or more events may include, but are not limited to, detecting the presence of the user (e.g., detecting the user located proximate to the inventory location, detecting the user reaching within the inventory location, etc.), detecting an item being placed at the inventory location, detecting an item being removed from the inventory location, and/or one or more other events. For instance, the inventory location may receive, at a first time, first sensor data generated by the capacitive sensor(s). The inventory location may then analyze the first sensor data to determine a first capacitance detected by the capacitive sensor(s) at the first time. Additionally, the inventory location may use the first capacitance as an initial capacitance for detecting events that occur at the inventory location.

For example, the inventory location may later receive, at a second time, second sensor data generated by the capacitive sensor(s). The inventory location may then analyze the second sensor data to determine a second capacitance detected by the capacitive sensor(s) at the second time. If the inventory location determines that the second capacitance is substantially equal to the first capacitance, then the inventory location may determine that an event has yet to occur at the inventory location. However, if the inventory location determines that the second capacitance is greater than the first capacitance, then the inventory location may determine that an object, such as a hand of the user, is located within the inventory location. The hand coming in and out is a well defined profile. Usually as a person tries to remove an item, there is a peaking due to approaching hand, followed by a step decrease due to item removal, then peaking disappears as had is pulled away. The inventory location may then use third sensor data generated at a third, later time to determine whether the event included the user placing an item at the inventory location, removing an item from the inventory location, or merely searching for an item, but without removing any items from the inventory location.

For instance, the inventory location may receive, at the third time, the third sensor data generated by the capacitive sensor(s). The inventory location may then analyze the third sensor data to determine a third capacitance detected by the capacitance sensor(s) at the third time. Next, if the inventory location determines that the third capacitance is greater than the first capacitance, then the inventory location may determine that the event included the user placing an item at the inventory location (these happen after hand is removed). Additionally, if the inventory location determines that the third capacitance is less than the first capacitance, then the inventory location may determine that the event included the user removing an item from the inventory location. Furthermore, if the inventory location determines that the third capacitance is substantially equal to the first capacitance, then the inventory location may determine that the event included the user searching for an item, but without removing any items.

As described herein, in some examples a first capacitance may be substantially equal to a second capacitance when the first capacitance is within a threshold capacitance to the second capacitance. The threshold capacitance may include, but is not limited to, capacitive values depend on item size and conductivity, current sensor selection saturates at 240 pF. Capacitive levels range from 1 pF to 240 pF (that range can be made to work with any items by controlling the sensor shapes, form factor and separation to ground. Additionally, or alternatively, in some examples, the first capacitance may be substantially similar to the second capacitance when the first capacitance and the second percentage are within a given percentage to one another. The given percentage may include, but is not limited to, 0.1%, 0.5%, 1%, 5%, and/or any other percentage.

In some examples, the inventory location may be configured to determine which item(s) were placed and/or removed from the inventory location and/or a number of item(s) that were placed and/or removed from the inventory location. For example, and for an item, the inventory location may store data representing a change in capacitance that occurs at the inventory location when the item is placed and/or removed from the inventory location. The inventory location may then use the data to determine which item(s) were placed and/or removed from the inventory location. For example, and using the example above, the inventory location may determine a difference between the third capacitance and the first capacitance. Next, and if the inventory location stores various types of items, the inventory location may compare the difference to the data to determine if the difference matches a change in capacitance associated with an object. Machine learning is highly beneficial here as we learn the change in capacitance during items stacking and predict which items are removed from that prior learning. If the difference matches the change in capacitance for an item, then the inventory location may identify that the item was placed or removed from the inventory location. Additionally, if the inventory location stores the same item, the inventory location may divide the difference by the change in capacitance associated with the item in order to determine the number of items placed or removed from the inventory location.

In the examples above, the apparatus (e.g., the cart or the inventory location) may include an integrated sensor driver. In some examples, the layers may include an application core space and a sensor core space. The sensor core space may include a low power processor space used to drive all of the capacitive sensor(s), which may remain on at all times. Additionally, the capacitive sensor may interface with the application space or core space.

Additionally, in the examples herein, the capacitive sensor(s) may include, but are not limited to, metal (e.g., copper, indium tin oxide, steel, aluminum, tantalum, sliver, sheet metal, etc.), printed ink, conductive paint, and/or any other material that may be used for capacitance. Additionally, in the examples herein, the grounding material may include, but is not limited to, metal, printed ink, conductive paint, sheet metal, and/or any other type of material that is used for grounding. For example, the cart may include a first insulating layer disposed on the frame of the cart, a conductive paint may be disposed on the first insulating layer, and then a second insulating layer may be disposed on the conductive paint. Additionally, a conductive/ground trace layer of paint may be disposed on the bottom of the first insulating layer. While this is just one example of what the setup may look for the conductive sensor(s), in other examples, the conductive sensor(s) and ground may be formed of any material.

Furthermore, in the examples above, the capacitive sensor(s) may include self-capacitance sensor(s). By using self-capacitance sensor(s) rather than mutual capacitance sensor(s), the apparatus may be able to detect users from a greater distance than the apparatus may detect users using the mutual capacitance sensor(s). However, in other examples, the capacitive sensor(s) may include mutual capacitance sensor(s).

By performing the processes described above, the apparatus is able to conserve power while still detecting the presence of users. For example, instead of the apparatus keeping one or more devices, such as imaging device(s) and/or ToF sensors, continuously active to detect the presence of users, the apparatus is able to use the capacitive sensor(s) to detect the presence of the users. This way, the apparatus is able to deactivate the device(s) during times at which users are not located proximate to the apparatus and activate the device(s) during times at which the users are located proximate to the apparatus. This saves power, since the capacitive sensor(s) use less power to operate than the device(s). As such, the apparatus is able to reduce the overall power used by the apparatus by turning off these device(s) when the apparatus is not in use by a user.

FIG. 1 illustrates an example process 100 for using capacitive sensor(s) 102 to detect a presence of a user 104 around a cart 106, in accordance with examples of the present disclosure. At 108, the process 100 may include detecting, using capacitive sensor(s) 102 located on a cart 106, a user 104 located proximate to the cart 106. For instance, the user 104 may approach a cart corral 110, or other location, which stores nested carts 112. The cart 106, which is originally included in the cart corral 110, may include the capacitive sensor(s) 102 located around at least a portion of a frame of the cart 106 (which is illustrated and described in more detail with respect to FIGS. 2-3). The cart 106 (e.g., a computing device and/or processor(s) associated with the cart 106) may receive first sensor data generated by the capacitive sensor(s) 102 and analyze the first sensor data in order to determine a first capacitance detected by the capacitive sensor(s) 102. The cart 106 may then determine that the user 104 is located proximate to the cart 106 based at least in part on the first capacitance.

For example, the cart 106 may compare the first capacitance to a first threshold capacitance and, based on the comparison, determine that the first capacitance satisfies the first threshold capacitance. Based on the determination, the cart 106 may determine that the user 104 is located within a threshold distance to the cart 106. In some examples, the cart 106 may then receive at least second sensor data generated by the capacitive sensor(s) 102. In such examples, the cart 106 may analyze the second sensor data to determine a second capacitance detected by the capacitive sensor(s) 102. The cart 106 may then analyze the second capacitance with respect to the first capacitance to determine that the user 104 is moving towards the cart 106. For example, the cart 106 may determine that the user 104 is moving towards the cart 106 based on the second capacitance being greater than the first capacitance.

In some example, the cart 106 may then perform one or more first actions based on determining that the user 104 is located proximate to the cart 106 and/or determining that the user 104 is moving toward the cart 106. For a first example, the cart 106 may cause a display associated with the cart 106 to activate (e.g., turn on). For a second example, the cart 106 may cause one or more other sensors associated with the cart 106 to activate (e.g., turn on). In other words, once the cart 106 detects the user 104, the cart 106 may begin to get "ready" to be used by the user 104 when shopping at a retail facility.

At 114, the process 100 may include detecting, using the capacitive sensor(s) 102, the user 104 contacting the cart 106. For instance, the cart 106 may receive third sensor data generated by the capacitive sensor(s) 102. The cart 106 may then analyze the third sensor data to determine a third capacitance detected by the capacitive sensor(s) 102. Additionally, the cart 106 may determine that the user 104 is contacting the cart 106 based at least in part on the third capacitance. For example, the cart 106 may compare the third capacitance to a second threshold capacitance and, based on the comparison, determine that the third capacitance satisfies the second threshold capacitance. Based on the determination, the cart 106 may determine that the user 104 is in contact with the cart 106. In some examples, the cart 106 may then perform one or more second actions based on the user 104 contacting the cart 106.

For a first example, if the cart 106 has yet to activate the display, then the cart 106 may cause the display to activate (e.g., turn on) in order to provide content for the user. For a second example, if the cart 106 has yet to activate the sensor(s), then the cart 106 may cause the sensor(s) to activate (e.g., turn on). In other words, once the cart 106 detects that the user 104 is now in contact with the cart 106, and thus going to use the cart 106 to shop at the retail facility, the cart 106 may continue to get "ready" to be used by the user 104 when shopping at the retail facility.

At 116, the process 100 may include detecting, using the capacitive sensor(s) 102, the user 104 located over a perimeter of the cart 106. For instance, the user 104 may remove an item 118 from an inventory location 120. As will be described in more detail below with regard to FIG. 7, the inventory location 120 may include capacitive sensor(s) for detecting when the user 104 removes the item 118 from the inventory location 120. The user 104 may then place the item 118 within the cart 106. To place the item within the cart 106, a portion of the user 104, such as the hand and arm of the user 104, may enter the opening located at a top perimeter of the cart 106 so that the user 104 may place the item 118 within an internal cavity of the cart 106. While the user 104 is placing the item 118 within the cart 106, the cart 106 may use the capacitive sensor(s) 102 to detect that the user 104 is located over the cart 106 and/or that the user 104 is located within the opening of the cart 106.

For example, and as illustrated in more detail below with regard to FIG. 4, the capacitive sensor(s) 102 may include first capacitive sensor(s) 102 located at a first side of the frame of the cart 106 and second capacitive sensor(s) 102 located at a second side of the frame of the cart 106. The cart 106 may thus receive fourth sensor data generated by the first capacitive sensor(s) 102 and fifth sensor data generated by the second capacitive sensor(s) 102. The cart 106 may then analyze the fourth sensor data to determine a fourth capacitance detected by the first capacitive sensor(s) 102 and analyze the fifth sensor data to determine a fifth capacitance detected by the second capacitive sensor(s) 102. Next, the cart 106 may determine that the fourth capacitance and the fifth capacitance both satisfy a third threshold capacitance.

Based on the determination, the cart 106 may determine that both the first capacitive sensor(s) 102 and the second capacitive sensor(s) 102 detected the user 104 at a same time and/or at an approximately same time. As described herein, an approximate same time may include, but is not limited to, within 1 millisecond, within 10 milliseconds, within 1 second, and/or within another time period. Since the first capacitive sensor(s) 102 and the second capacitive sensor(s) 102 are located on opposite sides of the opening, the cart 106 may thus determine that the user 104 is located over the perimeter of the cart 106 and/or that the user 104 is located within the opening of the cart 106. When the two sensors are combined for over basket detection, each sensor alone determines presence but the combination determined over basket While this example describes using capacitive sensors 102 located on different sides of the cart 106 to make this determination, in other examples, the cart 106 may use a single capacitive sensor 102, such as a single capacitive sensor 102 located within the interior cavity where the user 104 places the item 118.

In some examples, the cart 106 may then perform one or more third actions based on determining that the user 104 is located over the perimeter of the cart 106 and/or that the user 104 is located within the opening of the cart 106. For a first example, the cart 106 may cause one or more devices, such as one or more imaging devices, disposed on the cart 106 to activate, where the one or more devices are for identifying items placed within the cart 106. For a second example, the cart 106 may cause one or more other sensors, such as one or more weight sensors, associated with the cart 106 to deactivate for a period of time (e.g., 1 second, 2 seconds, 5 seconds, etc.). In some examples, such as when the sensor(s) include the weight sensor(s), the cart 106 may cause the weight sensor(s) to deactivate while the user 104 is located over the cart 106 and/or that the user 104 is located within the opening of the cart 106 such that the weight sensor(s) do not detect the weight of the user 104 when measuring the total weight within the interior cavity of the cart 106.

At 122, the process 100 may include detecting, using the capacitive sensor(s) 102, that the user 104 is no longer located proximate to the cart 106. For instance, once the user 104 is finished shopping, the user 104 may remove the item 118 from the cart 106 and then walk away from the cart 106. As such, the cart 106 may receive sixth sensor data generated by the capacitive sensor(s) 102. The cart 106 may then analyze the sixth sensor data in order to determine a sixth capacitance detected by the capacitive sensor(s) 102. Additionally, the cart 106 may determine that the sixth capacitance does not satisfy the first threshold capacitance (based on sensor output and time during for that output. Based on the determination, the cart 106 may determine that the user 104 is no longer proximate to the cart 106.

In some examples, the cart 106 may also receive at least seventh sensor data generated by the capacitive sensor(s) 102. In such examples, the cart 106 may analyze the seventh sensor data to determine a seventh capacitance detected by the capacitive sensor(s) 102. The cart 106 may then analyze the seventh capacitance with respect to the sixth capacitance to determine that the user 104 is moving away from the cart 106. For example, the cart 106 may determine that the user is moving away from the cart 106 based on the seventh capacitance being less than the first capacitance. We always look and sensor output and time (profile)

Additionally, in some examples, the cart 106 may determine that the user 104 is not located proximate to the cart 106 for a threshold period of time. For instance, the cart 106 may continue to receive, during the period of time, additional sensor data generated by the capacitive sensor(s) 102. The cart 106 may then continue to analyze the additional sensor data in order to determine additional capacitance(s) detected by the capacitive sensor(s) 102 during the period of time. Additionally, the cart 106 may determine that the additional capacitance(s) do not satisfy the first threshold capacitance. As such, the cart 106 may determine that the user 104 is not located proximate to the cart 106 during the period of time.

In some example, the cart 106 may then perform one or more fourth actions based on determining that the user 104 is no longer located proximate to the cart 106 (e.g., during the threshold period of time) and/or determining that the user 104 is moving away the cart 106. For a first example, the cart 106 may cause the display associated with the cart 106 to deactivate (e.g., turn off after a predetermined time after user moving away). For a second example, the cart 106 may cause one or more sensors associated with the cart 106 to deactivate (e.g., turn off). In other words, once the cart 106 detects that the user 104 is finished using the cart 106, the cart 106 may operate in a mode in which the cart 106 conserves power from an internal power source.

Figure 2:
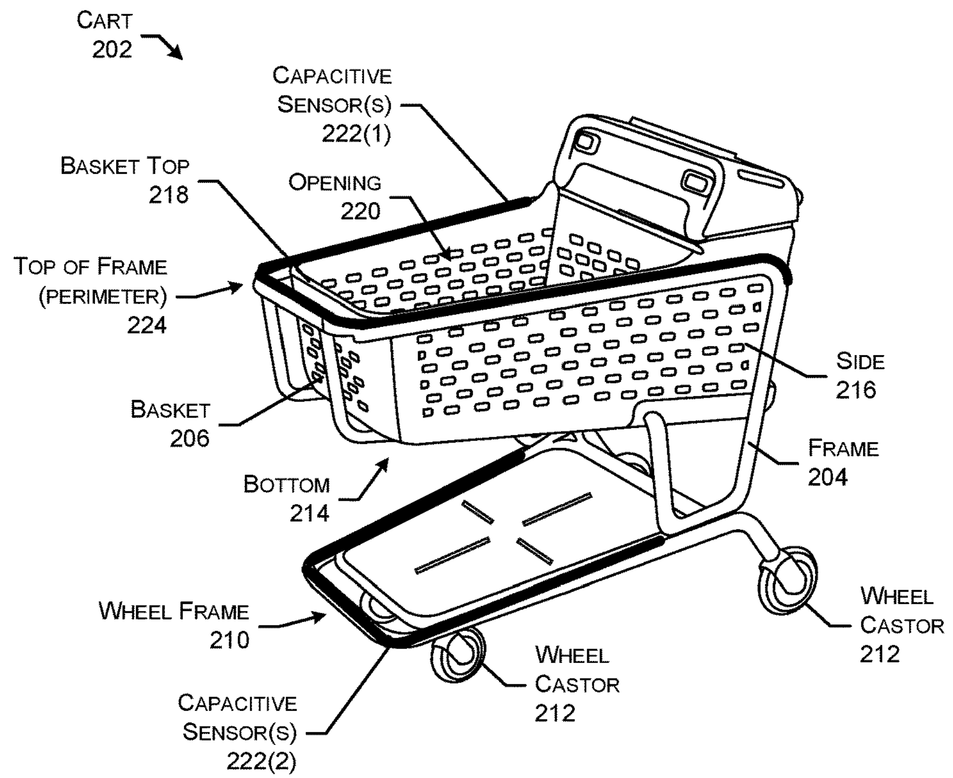
FIG. 2 illustrates an example of a cart that includes capacitive sensor(s), in accordance with examples of the present disclosure.
Figure 2:
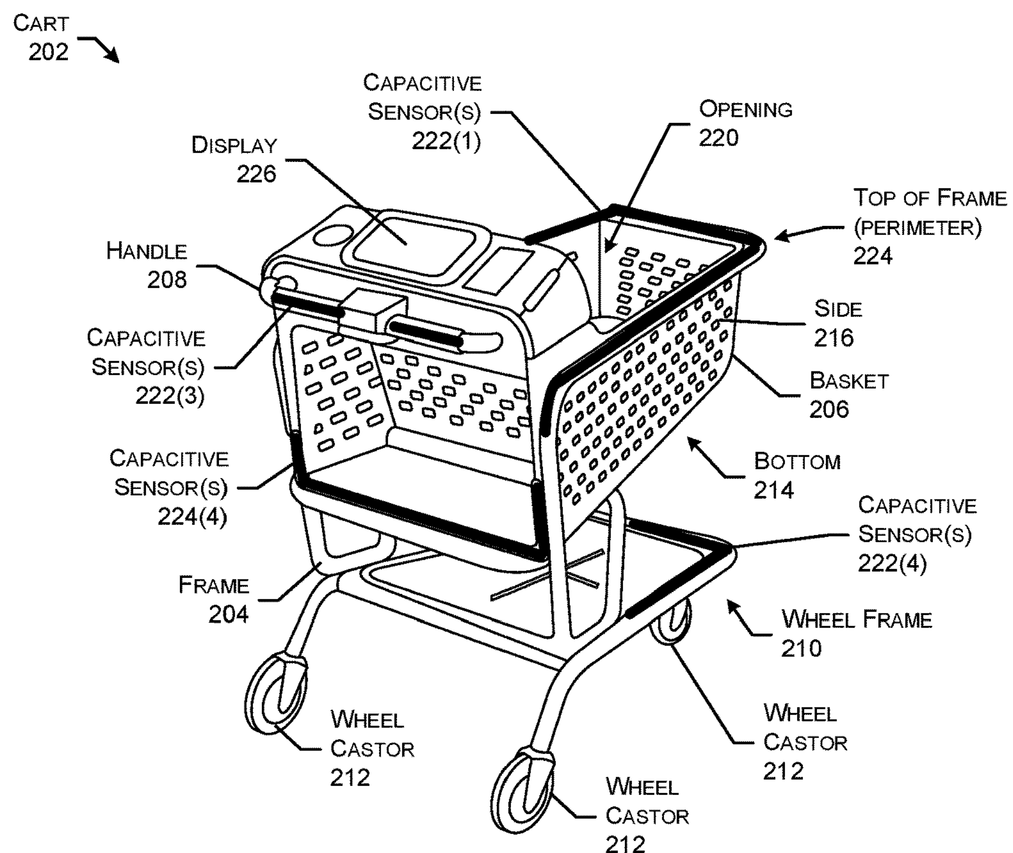

FIG. 2 illustrates an example of a cart 202 that includes capacitive sensor(s), in accordance with examples of the present disclosure. Similar to a traditional shopping cart, and as illustrated in the example of FIG. 2, the cart 106 may generally include or be formed of a main frame 204, a basket 206, a handle 208, a wheel frame 210, and one or more wheel castors 212 to enable movement of the cart 202 on a surface. The main frame 204, the basket 206, the handle 208, and the wheel frame 210 may be formed from any suitable materials such as plastics, wood, metals, composites or any other combinations of materials. Moreover, the main frame 204, the basket 206, the handle 208, and the wheel frame 210 may take any form.

The basket 206 may generally be part of the main frame 204 and/or supported by the main frame 204 (e.g., be welded, fused, adhered, bolted, screwed, molded, or otherwise joined to the main frame 204). In some examples, the basket 206 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 206 may generally be any shape that defines an interior cavity, or receptacle, for receiving items that are placed in the cart 202. The basket 206 may comprise a bottom 214, multiple sides 216 protruding from the bottom 214, and a top 218. In some examples, the bottom 214 may be in the shape of a quadrilateral such that there are four sides protruding from the bottom 214 of the basket 206. Similarly, the top 218 of the basket 206 may be defined according to the quadrilateral shape and have a perimeter with four corners. The perimeter of the top 218 of the basket 206 may define an opening 220 to the interior cavity (or receptacle) of the basket 206 to receive items placed inside the basket 260. In various examples, the perimeter of the top 218 of the basket 206 may be disposed in a substantially horizontal plane (e.g., a plane substantially along the x-axis as illustrated), and the main frame 204 may include at least one vertical member that extends downward from the basket 206 to the wheel frame 210 along a substantially vertical plane (e.g., a plane substantially along the y-axis as illustrated).

The wheel frame 210 may support the one or more wheel castors 212 to enable movement of the cart 202 along a surface. The wheel casters 212 include one or more wheels, axles, forks, joints or other components which enable the cart 202 to travel on various surfaces.

For instance, in some examples each of the wheel casters 212 may include a single wheel provided on an axle within a fork, or two or more wheels provided on such an axle. In some other examples, the wheel casters 212 may include two or more axles. Alternatively, in still other examples, a single caster may be provided in lieu of the multiple wheel casters 212 shown in FIG. 2.

In accordance with the present disclosure, the wheel casters 212 may operate in any manner, such as being configured to pivot or swivel, and thus automatically adjust or align with a direction of travel. In some examples, the cart 202 may be equipped with other apparatuses for enabling the cart 202 to travel on solid surfaces, including one or more wheeled components other than casters, including but not limited to omnidirectional wheels, spherical wheels or other like apparatuses. Additionally, in some other examples, the cart 202 may include two or more skis or other runners for traveling on smooth surfaces. In still other examples, the cart 202 may be levitated, e.g., by magnetic levitation through the use of one or more linear induction motors. Moreover, the cart 202 may be propelled or pushed by humans or autonomous mobile robots or, alternatively, by one or more motors (e.g., electric-powered or gasoline-powered).

As further illustrated in the example of FIG. 2, the cart 202 may include capacitive sensors 222(1)-(4) (also referred to singularly as "capacitive sensor 222" or plurally as "capacitive sensors 222"). As shown, the cart 202 may include first capacitive sensor(s) 222(1) located around at least a portion of a top 224 of the main frame 204, second capacitive sensor(s) 222(2) located around at least a portion of the wheel frame 210 of the cart 202, third capacitive sensor(s) 222(3) located on at least a portion of the handle 208 of the cart 202, and/or fourth capacitive sensor(s) 222(4) located on at least a portion of a bottom of the main frame 204 of the cart 202. While the example of FIG. 2 illustrates four different capacitive sensor(s) 222 located at four different locations on the cart 202, in some examples, the cart 202 may not include one or more of the capacitive sensor(s) 222. Additionally, in other examples, the cart 202 may include additional capacitive sensor(s) 222 located at additional locations on the cart 202.

In some examples, the first capacitive sensor(s) 222(1) may include a single capacitive sensor 222 that is located on the insulation of the top 224 of the main frame 204. In such example, at least a majority of the main frame 204 of the cart 202 (e.g., the top 224 of the main frame 204) may be energized and act like the capacitive sensor. This way, the cart 202 does not request that the first capacitive sensor(s) 222(1) be disposed along the entire top 224 of the main frame 204 in order for the entire top 224 of the main frame 204 to act as a capacitive sensor. An example of such a layout for the first capacitive sensor(s) 222(1) is illustrated and discussed in more detail with respect to FIGS. 5A-5B.

Alternatively, in some examples, the first capacitive sensor(s) 222(1) may include capacitive sensor(s) 222(1) located on a first side of the top 224 of the main frame 204 and capacitive sensor(s) 222(1) located on a second side of the top 224 of the main frame 204. In such examples, the cart 202 may further include a driven shield that is located between the first capacitive sensors 222(1) and the top 224 of the main frame 204. By placing the first capacitive sensors 222(1) using such a technique, and as illustrated and discuss in more detail with regard to FIG. 6, the cart 202 is able to determine which side of the cart 202 the user is located when the cart 202 detects the user in this case the frame is no longer energized due to presence of driven shield. For example, the cart 202 is able to determine whether the user is located proximate to the first side, whether the user is touching the first side, whether the user is located proximate to the second side, and/or whether the user is touching the second side. Additionally, the cart 202 is able to determine when the user is located over the top 224 of the main frame 204 and/or located within the opening 220 of the basket 206.

In the example of FIG. 2, the third capacitive sensor(s) 222(3) include a capacitive sensor(s) 222(3) located on a left part of the handle 208 (e.g., a left grip of the handle 208) and capacitive sensor(s) 222(3) located on a right part of the handle 208 (e.g., a right grip of the handle 208). This way, the cart 202 is able to determine whether the user is touching the right part of the handle 208, the left part of the handle 208, and/or both parts of the handle 208. In some examples, the cart 202 may perform different actions based on the determination. For example, the cart 202 may activate a device when the user is touching only one part of the handle, but deactivate the device when the user is touching both parts of the handle.

As further illustrated in the example of FIG. 2 (and the example of FIG. 9), the cart 202 may include additional devices. The additional devices may include, but are not limited to, a display 226, a sensor (e.g., a motion sensor, a weight sensor, an accelerometer, a location sensor, a ToF sensor, etc.), a microphone, a speaker, a lighting device, and/or any other type of device. For example, the cart 202 may include one or more devices (e.g., imaging device(s), weight sensor(s), etc.) that include components for use in identifying items placed in the basket 206, and removed from the basket 206. The cart 202 may be positioned at any location on the cart 202 (e.g., in the basket 206, on the basket 206, mounted to the main frame 204, mounted to the basket 206, and/or any other location). In some examples, the cart 202 may include at least four capture devices that are disposed or coupled proximate to four corners of the top 218 of the basket 206. In some examples, one or all of the components of the capture devices may be disposed internal to the form factor of the basket 206 and/or main frame 204, at least partially internal to the form factor of the basket 206, and/or entirely external to the form factor of the basket 206 (e.g., mounted to the cart 202).

As shown below, the cart 202 may further include a battery pack module that houses one or more batteries to power the components of the cart 202. The battery pack module may include rechargeable batteries. In some examples, the battery pack module may be detachably coupled to the wheel frame 210 and/or the main frame 204 of the cart 202 such that the battery pack module may be removed and taken to a charging station. In some examples, the battery pack module may include rechargeable batteries that may be charged when the cart 202 is placed in a cart corral (e.g., through electrical contacts, power cords, etc.). In various examples, the main frame 204 and/or the basket 206 may have one or more channels (e.g., grooves, holes, paths, tunnels, etc.) through which power cables/cords may pass. In this way, power cables may be run at least partially through the channels in the main frame 204 and/or the basket 206 inconspicuously to provide power to the various components of the cart 202.

Figure 3A:
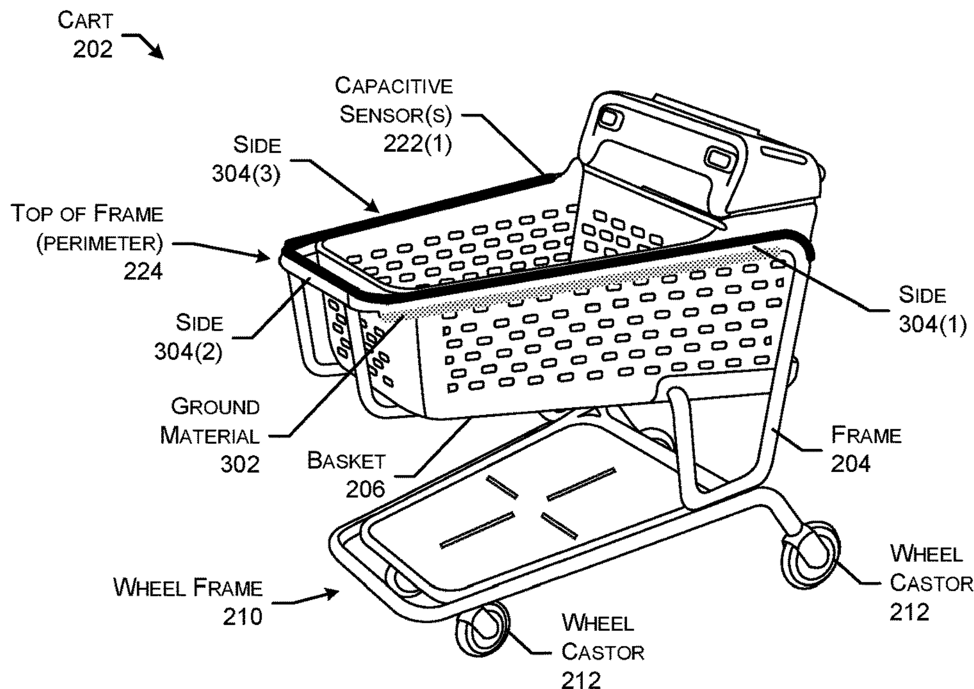
FIGS. 3A-3B illustrate examples for placing ground material on a cart, in accordance with examples of the present disclosure.
Figure 3B:
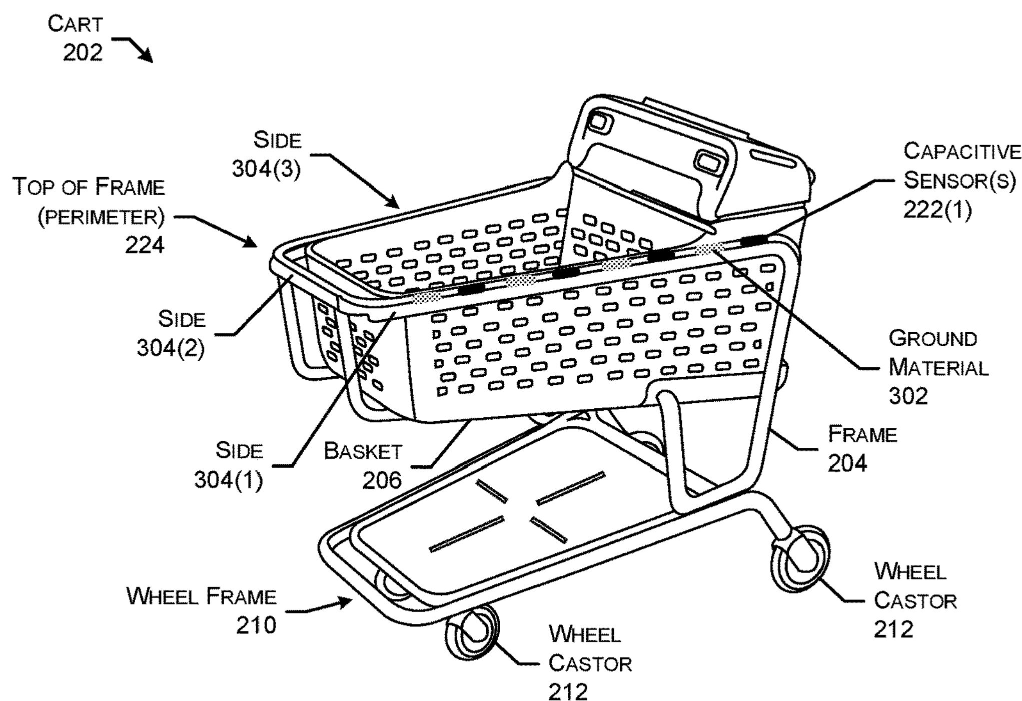

FIGS. 3A-3B illustrate examples for placing grounding material on the cart 202, in accordance with examples of the present disclosure. As shown by the example of FIG. 3A, the first capacitive sensor(s) 222(1) may be located along a majority of a top surface of the top 224 of the main frame 204. Additionally, a ground material 302 may be located along a majority of a bottom surface of the top 224 (not part of frame but on basket) of the main frame 204. For example, and as will be illustrated in FIGS. 5A-5B, the metal (and, in some examples, insulation around the metal) from the top 224 of the main frame 204 separates the first capacitive sensor(s) 222(1) from the ground material 302.

In the example of FIG. 3A, the first capacitive sensor(s) 222(1) are located on a first side 304(1), a second side 304(2), and a third side 304(3) of the top 224 of the main frame 204. Additionally, the ground material 302 is located on the first side 304(1) and the third side 304(3) (although no shown for clarity reasons) of the top 224 of the main frame 204. However, in other examples, the first capacitive sensor(s) 222(1) and/or the ground material 302 may be located on additional and/or alternative sides 304(1)-(3) of the top 224 of the main frame 204. Additionally, in some examples, the first capacitive sensor(s) 222(1) and the ground material 302 are substantially parallel with one another along the top 224 of the main frame 204.

As shown by the example of FIG. 3B, a pattern is used where portions of the first capacitive sensor(s) 222(1) and portions of the ground material 302 alternate along the top 224 of the main frame 204. In such an example, each portion of the first capacitive sensor(s) 222(1) may include a first width and each portion of the ground material 302 may include a second width. As described herein, a width may include, but is not limited to, 1 millimeter, 5 millimeters, 10 millimeters, and/or any other width. In some examples, the first width is equal to the second width while in other examples, the first width is different than the second width. Additionally, each portion of the first capacitive sensor(s) 222(1) may be separated by each portion of the ground material 302 by a given distance. The given distance may include, but is not limited to, 15 millimeters, 25 millimeters, 35 millimeters, and/or any other distance.

In the examples of FIG. 3B, driven shields may be located between each portion of the first capacitive sensor(s) 222(1) and the top 224 of the main frame 204 and between each portion of the ground material 302 and the top 224 of the main frame 204. Additionally, while the example of FIG. 3B only illustrates the first capacitive sensor(s) 222(1) and the ground material 302 located on the first side 304(1) of the top 224 of the main frame 204, the first capacitive sensor(s) 222(1) and the ground material 302 may also be located on the second side 304(2) of the top 224 of the main frame 204 and/or the third side 304(3) of the top 224 of the main frame 204.

While these are just a couple examples of where the ground material 302 may be placed on the cart 202, in other examples, the ground material 302 may be placed at additional and/or alternative locations on the cart 202. For a first example, the ground material 302 may be located on at least a portion of the wheel frame 210, such as where the wheel frame 210 curves to connect to the back wheel castors 212. For a second example, the ground material 302 may be located on the basket 206, such as on the bottom surface of the bottom of the basket 206.

Figure 4:
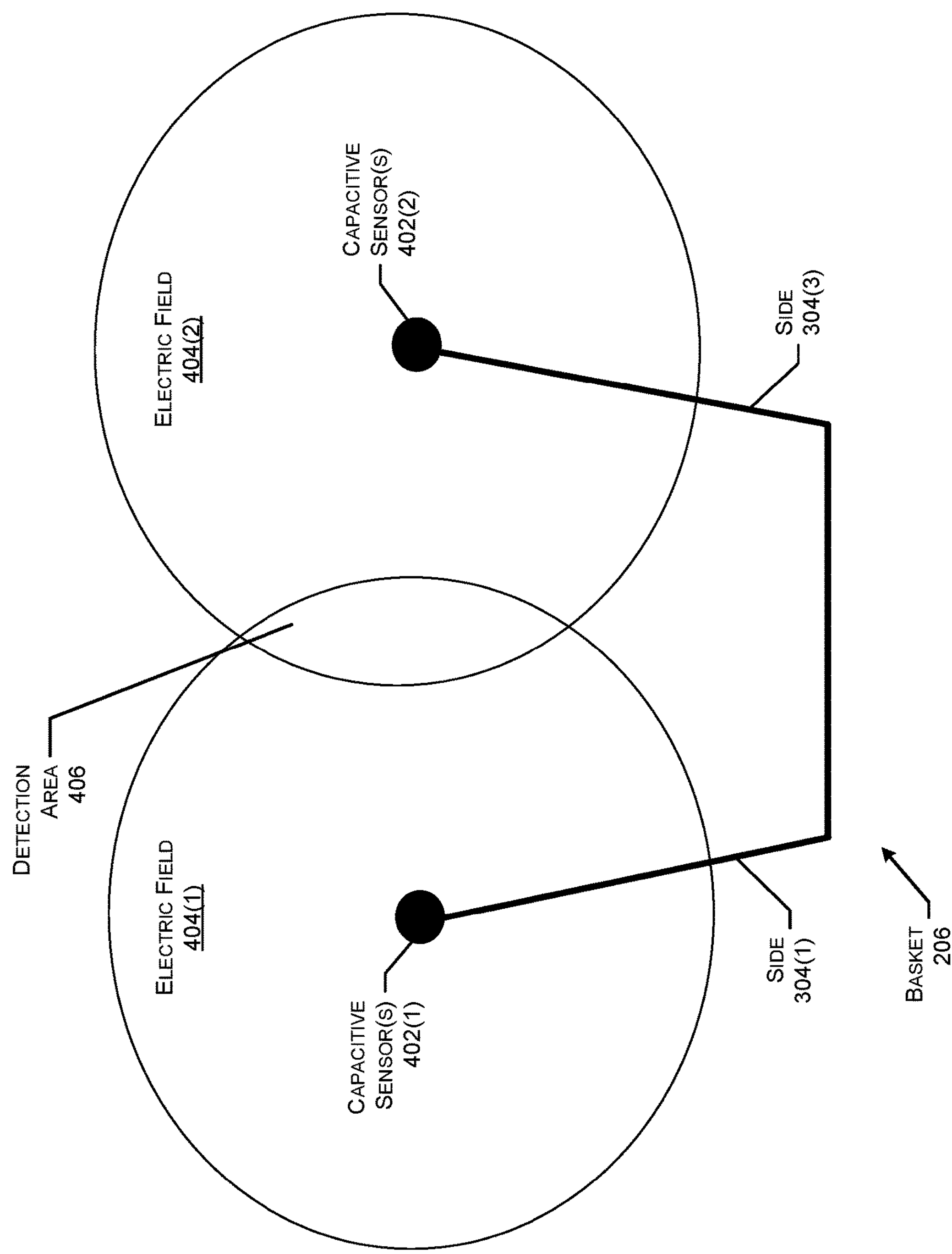
FIG. 4 illustrates an example of using capacitive sensors located on sides of a cart in order to determine when a user is located over a perimeter of the cart, in accordance with examples of the present disclosure.

FIG. 4 illustrates an example of using capacitive sensors 402(1)-(2) (which may include, and/or represent, the first capacitive sensor(s) 222(1)) located on the sides 304(1) and 304(3) of the cart 202 in order to determine when the user is located over the top 224 of the main frame 204, in accordance with examples of the present disclosure. As shown, the first capacitive sensor(s) 402(1) located on the first side 304(1) may generate a first electric field 404(1) and the second capacitive sensor(s) 402(2) located on the third side 304(3) may generate a second electric field 404(2). As such, the cart 202 may be configured to detect the user located proximate to the first side 304(1) of the cart 202 using the first capacitive sensor(s) 402(1) and also detect the user located proximate to the third side 304(3) of the cart 202 using the second capacitive sensor(s) 402(2).

Additionally, the cart 202 may detect that the user is located over the top 224 of the main frame 204 and/or a portion of the basket 206 based on detecting the user using both the first capacitive sensor(s) 402(1) and the second capacitive sensor(s) 402(2) at approximately a same time. In some examples, this may occur in a detection area 406 where the first electric field 404(1) and the second electric field 404(2) overlap with one another. While the example of FIG. 4 illustrates the detection area 406 as including only a portion of the area above the basket 206, in other examples, the capacitive sensors 402(1)-(2) may be configured such that the detection area 406 includes a majority of the basket 206. However, in these examples, the capacitive sensors 402(1)-(2) may also be configured such that the first electric field 404(1) does not cross the third side 304(3) and the second electric field 404(2) does not cross the first side 304(1). This way, the first capacitive sensor(s) 402(1) are not able to detect the user when the user is located on the third side 304(3) of the cart 202 and the second capacitive sensor(s) 402(2) are not able to detect the user when the user is located on the first side 304(1) of the cart 202.

Figure 5A:
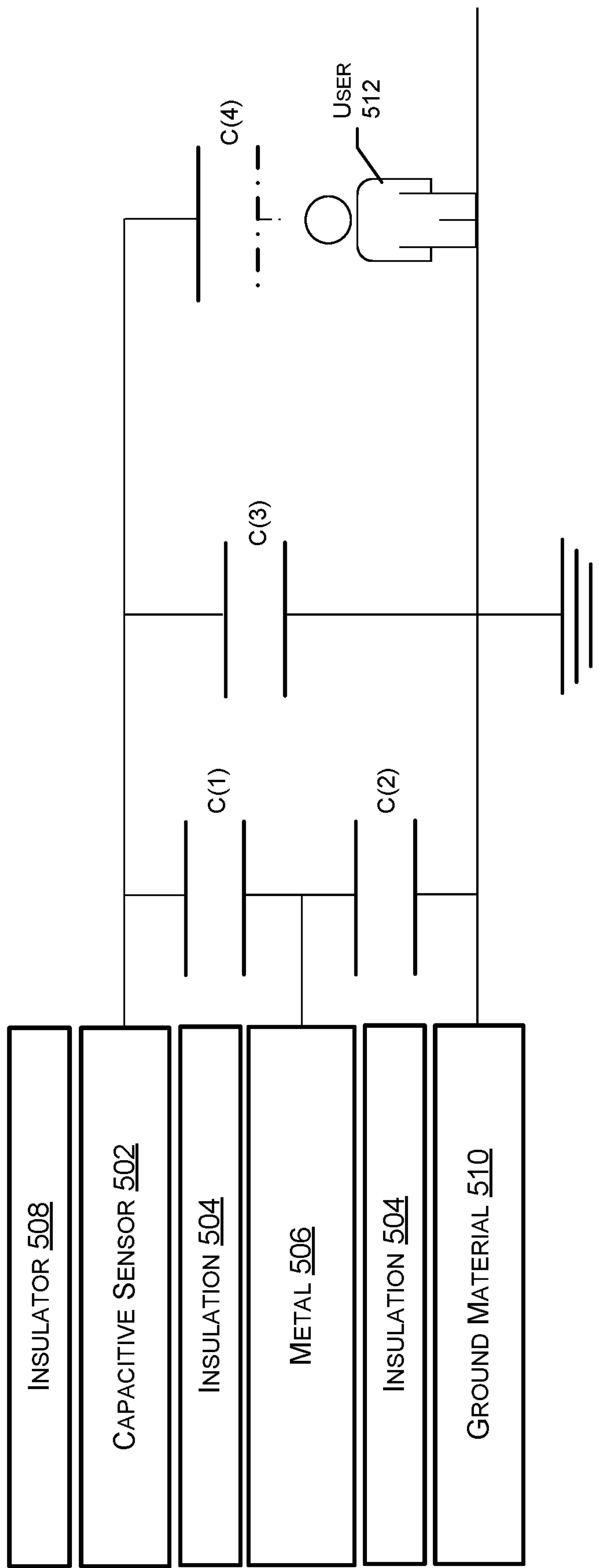
FIGS. 5A-5B illustrate examples of generating capacitance when a user approaches and/or touches a cart, in accordance with examples of the present disclosure.
Figure 5B:
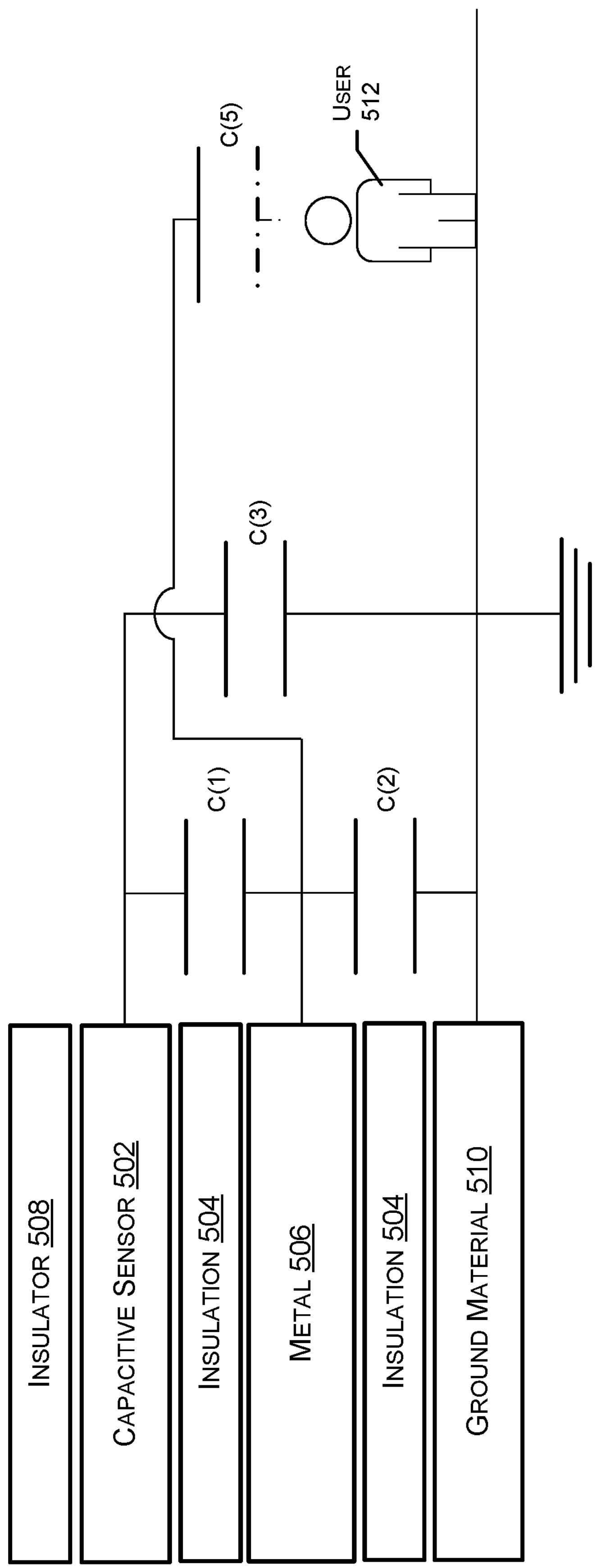

FIGS. 5A-5B illustrate examples of generating capacitance when a user approaches and/or touches a cart, in accordance with examples of the present disclosure. As discussed above, in some examples, a capacitive sensor 502 (which may include, and/or represent, the capacitive sensor(s) 222), may be placed on insulation 504 that is disposed around metal 506 of the main frame 204. An insulator 508 may then be disposed on the capacitive sensor 502 and ground material 510 may be disposed under the insulation 504 below the metal 506. As shown, this configuration for the capacitive sensor 502 may create at least a first capacitance C(1) between the capacitive sensor 502 and the metal 506, a second capacitance C(2) between the metal 506 and the ground material 510, and a third capacitance C(3) between the capacitive sensor 502 and the ground material 510. In some examples, the cart 202 zeroes out these three capacitance C(1)-C(3) since they are approximately constant.

In the example of FIG. 5A, a user 512 may contact an area of the main frame 204 at which the capacitive sensor 502 is located. For example, the user 512 may touch a portion of the insulator 508 that is disposed over the capacitive sensor 502. This creates a fourth capacitance C(4) between the capacitive sensor 502, the user 512, and the ground material 510 (user is standing on earth ground, 510 is battery ground, the two grounds couple since user is near battery ground when near cart. In some examples, the cart 202 then uses the fourth capacitance C(4) in order to detect that the user 512 is located proximate to the cart 202 and/or that the user 512 is in contact with the cart 202.

In the example of FIG. 5B, the user 512 may now contact an area of the main frame 204 at which the capacitive sensor 502 is not located. This creates a fifth capacitance C(5) between the metal 506, the user 512, and the ground material 510, however, the fifth capacitance C(5) may be less than the fourth capacitance C(4) in the example of FIG. 5A since it is in series with C1 (total series capacitance is smaller than the smallest of the two individual capacitances. The cart 202 may still be able to use the fifth capacitance C(5) in order to detect that the user 512 is located proximate to the cart 202 and/or that the user 512 is in contact with the cart 202. For example, the fifth capacitance C(5) may be in parallel with the third capacitance C5(3), where the combined capacitance from the fifth capacitance C(5) and the third capacitance C(3) is in series with the second capacitance C(2). As such, the total capacitance is less than the combined capacitance and that is why the cart 202 is able to detect the presence of the user 512.

Figure 6:
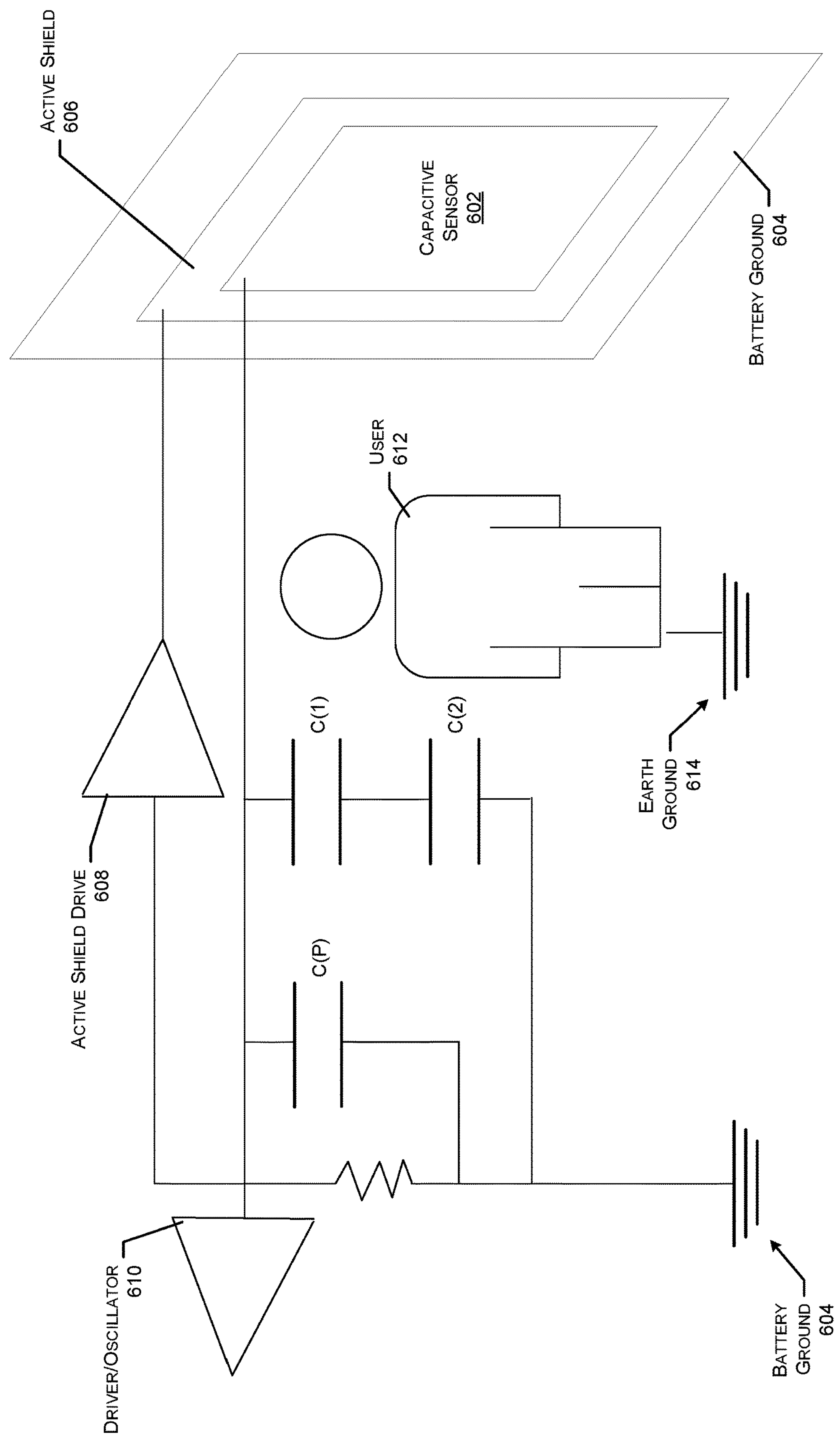
FIG. 6 illustrates another example of generating a capacitance when a user approaches and/or touches a cart, in accordance with examples of the present disclosure.

FIG. 6 illustrates another example of generating a capacitance when a user approaches and/or touches a cart, in accordance with examples of the present disclosure. As shown, the example of FIG. 6 includes at least a capacitive sensor 602, a battery ground 604, an active shield 606 (e.g., a driven shield), an activate field drive 608, a drive/oscillator 610 for the capacitive sensor 602, a user 612, and earth ground 614. In the example of FIG. 6, the capacitive sensor 602 may be disposed on the activate shield 606. For instance, FIG. 6 may represent the configuration where the activate shield 606 is disposed between the main frame 204 and the capacitive sensor 602.

In the example of FIG. 6, when the user 612 gets close to the capacitive sensor 602 (e.g., the user 612 gets close to touching the main frame 204), a sensor capacitance, which is the first capacitance C(1), is formed and begins to increase. Additionally, the user 612 may also be getting close to the battery ground 604. This may also create a ground capacitance, which is a second capacitance C(2) (the two capacitances in series close the loop to battery power hardware causing detection. Without C2, C1 bottom end is open/disconnected leading to no or weak detection.). In the example of FIG. 6, the sensor capacitance and the ground capacitance are in series with one another. This is because the battery ground 604 will close the loop. Make earth ground symbol different from battery ground in FIG. 6. And connect user between C1 and C2.

The example of FIG. 6 also illustrates a parasitic coupling C(P) between the battery and the earth ground 614. Additionally, in the example of FIG. 6, the active field is driven substantially with equal voltage of sensor. As such there is no electric field created between the capacitive sensor 602 and the activate shield 606.

Figure 7A:
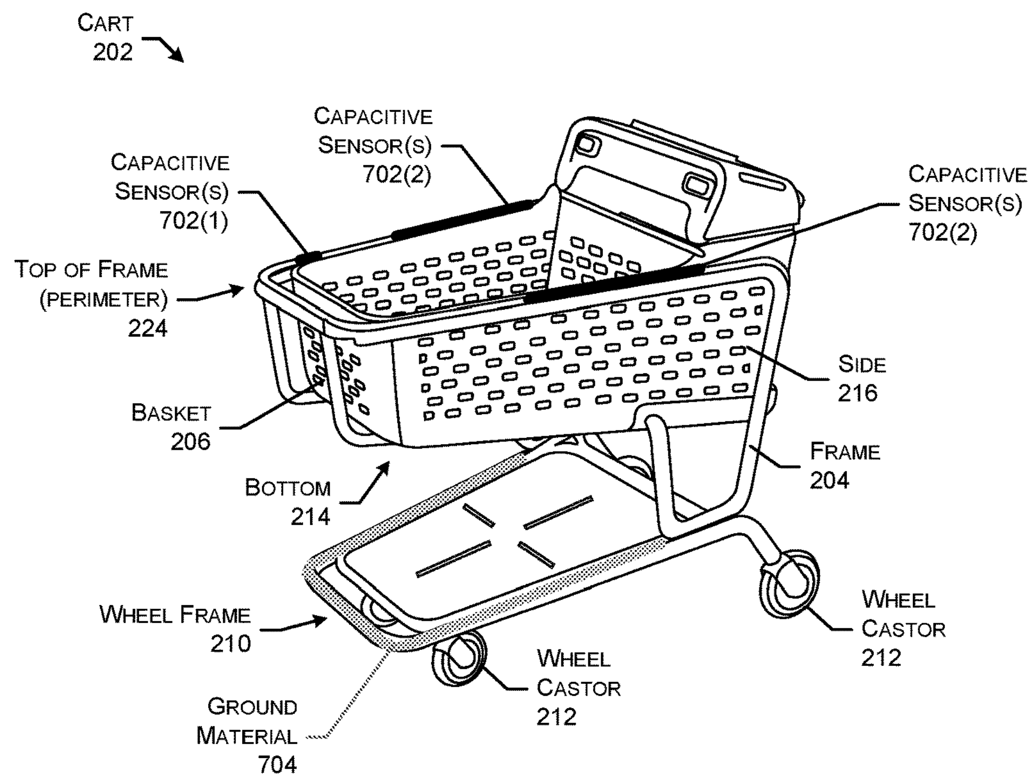
FIG. 7A illustrates example of a cart that includes multiple capacitive sensors, in accordance with examples of the present disclosure.

FIG. 7A illustrates example of the cart 202 that now includes multiple capacitive sensor(s) 702(1)-(2), in accordance with examples of the present disclosure. As shown, the cart 202 may include a first capacitive sensor 702(1) that is disposed on the insulation of the frame 224 (e.g., see the examples of FIGS. 5A-5B). As such, a majority of the top 224 of the frame 204, which includes portions of the top 224 of the frame 204 for which the first capacitive sensor 702(1) is not located, may still be energized and act like the capacitive sensor. In some examples, the top 224 of the frame 204 may be directly connected to the first capacitive sensor 702(1) by removing the powered insulation such as using a bolt/screw.

The cart 202 also includes second capacitive sensors 702(2) that are disposed on each side of the top 224 of the frame 204. In some examples, the second capacitive sensors 702(2) may include Snap-On capacitive sensors that attach to the top 224 of the frame 204. In some examples, the cart 202 may also include insulation and/or a drive shield that are disposed between each of the second capacitive sensors 702(2) and the top 224 of the frame 204 (e.g., see the example of FIG. 6). While the example of FIG. 7A only shows the second capacitive sensors 702(2) located on portions of the sides of the top 224 of the frame 204, in other examples, the second capacitive sensors 702(2) may be located on entireties of the sides of the top 224 of the frame 204 and/or on other location(s) of the frame 204.

Figure 7B:
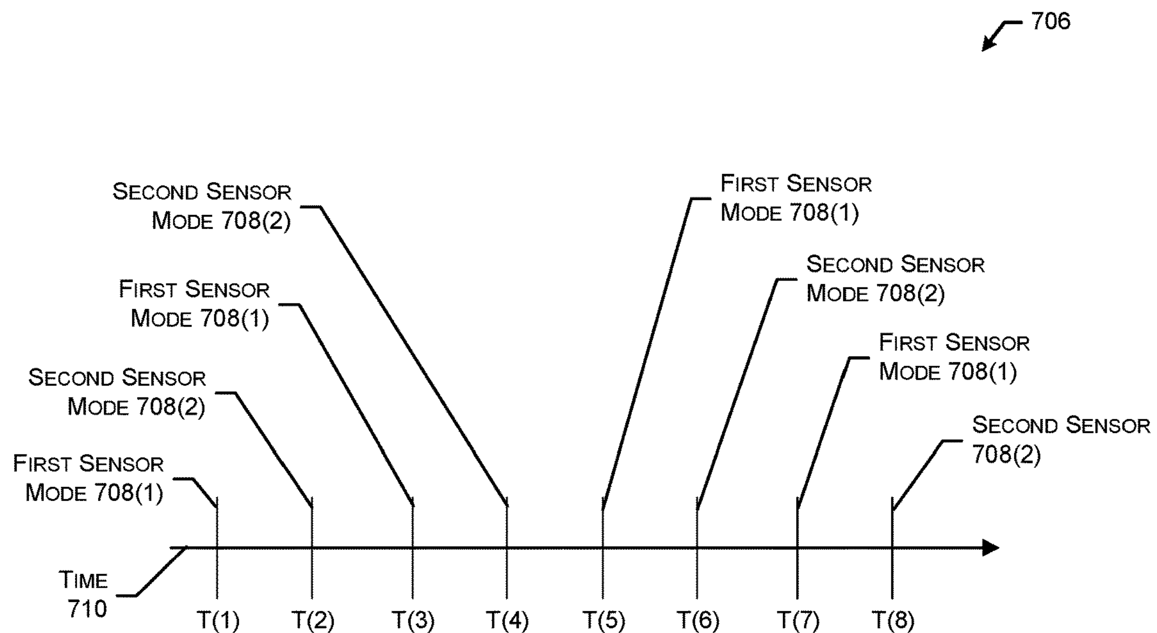
FIG. 7B illustrates an example of different sensor modes that the cart from FIG. 7A may use for the capacitive sensors, in accordance with examples of the present disclosure.

In the example of FIG. 7A, and as shown in FIG. 7B, the cart 202 may alternate between activating the first capacitive sensor 702(1) and the second capacitive sensors 702(2) to act as the capacitive sensor for the cart 202. For example, the cart 202 may activate the first capacitive sensor 702(1) and deactivate the second capacitive sensors 702(2) during a first period of time, followed by activating the second capacitive sensors 702(2) and deactivating the first capacitive sensor 702(1) during a second period of time, followed by activating the first capacitive sensor 702(1) and deactivating the second capacitive sensors 702(2) during a third period of time, followed by activating the second capacitive sensors 702(2) and deactivating the first capacitive sensor 702(1) during a fourth period of time, and/or so forth. As described herein, a period of time may include, but is not limited to, 50 milliseconds, 100 milliseconds, 500 milliseconds, 1 second, and/or any other period of time.

Additionally, in the example of FIG. 7A, the second capacitive sensors 702(2) may operate as grounds for the first capacitive sensor 702(1) while the first capacitive sensor 702(1) is activate and the first capacitive sensor 702(1) may act as the ground for the second capacitive sensors 702(2) while the second capacitive sensors 702(2) are active. For example, the first capacitive sensor 702(1) may act as the ground for the second capacitive sensors 702(2) when the second capacitive sensors is active to help user detection. Additionally, the second capacitive sensors 702(2) may acts as the ground for the first capacitive sensor 702(1) when the first capacitive sensor 702(1) detect the user in contact with the frame 204 of the cart 202.

As further shown by the example of FIG. 7A, the cart 202 may include ground material 304 located on the wheel frame 210. However, in other examples, the ground material 304 may be located on additional and/or alternative portions of the cart 202.

FIG. 7B illustrates an example of different sensor modes that the cart 202 may use for the capacitive sensors 702(1)-(2), in accordance with examples of the present disclosure. As shown by a graph 706, the cart 202 may switch between a first sensor mode 708(1) and a second sensor mode 708(2) over time 710. For example, the cart 202 may start operating in the first sensor mode 708(1) at a first time T(1) and then continue to operate in the first sensor mode 708(1) between the first time T(1) and a second time T(2). The cart 202 may then start operating in the second sensor mode 708(2) at the second time T(2) and then continue to operate in the second sensor mode 708(2) between the second time T(2) and a third time T(3). Next, the cart 202 may again start operating in the first sensor mode 708(1) at the third time T(3) and then continue to operate in the first sensor mode 708(1) between the third time T(3) and a fourth time T(4). The cart 202 may then continue this switching between the sensor modes 708(1)-(2) over the time 710.

In some examples, the cart 202 may operate in the first sensor mode 708(1) by causing the first capacitive sensor 702(1) (e.g., the top 224 of the frame 204) to act as the capacitive sensor and causing the second capacitive sensors 702(2) to be disabled, off or act as the ground. Additionally, the cart 202 may operate in the second sensor mode 708(2) by causing the second capacitive sensors 702(2) to act as the capacitive sensors and causing the first capacitive sensor 702(1) (e.g., the top 224 of the frame 204) to act as the ground. In other words, the cart 202 may be configured to detect users in contact with the cart 202 when operating in the first sensor mode 708(1) and be configured to detect users proximate to the cart 202 when operating in the second sensor mode 708(2).

In some examples, the periods of time between each of the times T(1)-(8) may be substantially equal to one another. For instance, and as described above, the period of time may include, but is not limited to, 1 milliseconds, 50 milliseconds, 100 milliseconds, 500 milliseconds, 1 second, and/or any other period of time. However, in other examples, the periods of time between one or more of the times T(1)-(8) may be different from one another. For a first example, the periods of time that the cart 202 operates in the first sensor mode 708(1) may be less than or greater than the periods of time that the cart 202 operates in the second sensor mode 708(2). For a second example, the periods of time that the cart 202 operates in the second sensor mode 708(2) may be greater than the periods of time that the cart 202 operates in the first sensor mode 708(1) until the cart 202 detects a user proximate to the cart 202. Detection of user could be achieved over a period of many time cycles not just one as well (the user's presence is monitored in each time cycle). For example, as user approached cart, the first time cycle detects a small increase in capacitance, the third time cycle detects an even higher capacitance, etc. The SW will look at multiple time cycles (not just one) belonging to the active sensor (1,3,5,7, etc) and determines user is approaching by assessing the collective behavior.

Figure 8:
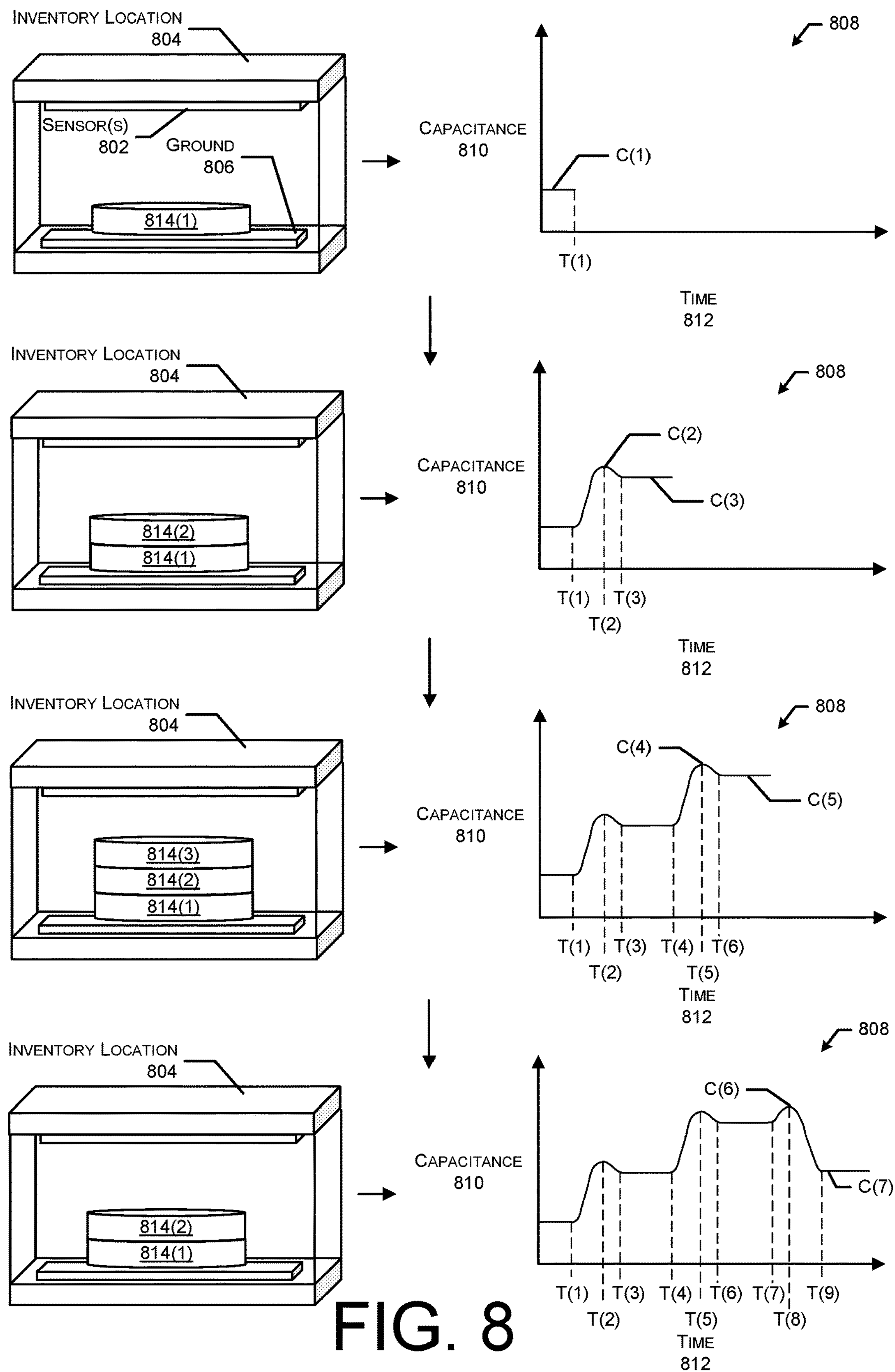
FIG. 8 illustrates an example of using capacitive sensor(s) to detect events that occur at an inventory location, in accordance with examples of the present disclosure.

FIG. 8 illustrates an example of using capacitive sensor(s) 802 to detect events that occur at an inventory location 804, in accordance with examples of the present disclosure. In the example of FIG. 8, the inventory location 804 includes the capacitive sensor(s) 802 located on a top surface of the inventory location 804 and ground material 806 located on a bottom surface of the inventory location 804. The example of FIG. 8 also illustrates a graph 808 showing a capacitance 810 detected by the capacitive sensor(s) 802 over a period of time 812.

As shown by the top illustration, at a first time T(1), a first item 814(1) is located at the inventory location 804. As such, the inventory location 804 (e.g., a computing device and/or processor(s) associated with the inventory location 804) may receive first sensor data generated by the capacitive sensor(s) 802. The inventory location 804 may then analyze the first sensor data to determine a first capacitance C(1) detected by the capacitive sensor(s) 802 at the first time T(1). In some examples, the inventory location 804 may then use the first capacitance C(1) in order to detect when a first event occurs with respect to the inventory location 804.

For example, and as illustrated by the second illustration from the top, the first event, which occurs between the first time T(1) and a third time (3), may include a first user placing a second item 814(2) at the inventory location 804. As such, at a second time T(2), the inventory location 804 may receive second sensor data generated by the capacitive sensor(s) 802. The inventory location 804 may then analyze the second sensor data to determine a second capacitance C(2) detected by the capacitive sensor(s) 802 at the second time T(2). Additionally, the inventory location 804 may determine that the second capacitance C(2) is greater than the first capacitance C(1). As such, the inventory location 804 may determine that the first event associated with the inventory location 804 is occurring.

As such, at a third time T(3), the inventory location 804 may receive third sensor data generated by the capacitive sensor(s) 802. The inventory location 804 may then analyze the third sensor data to determine a third capacitance C(3) detected by the capacitive sensor(s) 802 at the third time T(3). Additionally, the inventory location 804 may determine that the third capacitance C(3) is less than the second capacitance C(2). In some examples, based on the determination, the inventory location 804 may thus determine that the first event is finished. For example, the inventory location 804 may determine that the second capacitance C(2) that capacitance is only momentary so cap profile will detect that and point to hand) represents the first user placing his or her hand within the inventory location 804 and the third capacitance C(3) represents the capacitance 810 within the inventory location 804 when the first user removes the hand.

Additionally, the inventory location 804 may determine that the first event included the first user placing the second item 814(2) to the inventory location 804. In some examples, the inventory location 804 may make the determination based on the third capacitance C(3) being greater than the first capacitance C(1). In other words, the inventory location 804 may determine that an event includes placing an item when the capacitive sensor(s) 802 detect an increase in the capacitance 810 within the inventory location 804. In some examples, the inventory location 804 may also determine the type of item and/or the number of items placed at the inventory location 804. For example, the inventory location 804 may determine a difference between the third capacitance C(3) and the first capacitance C(1). The inventory location 804 may then determine the type of item and/or the number of items based on the difference.

For a first example, the inventory location 804 may store data representing changes in capacitance that occur for various types of items that may be placed at the inventory location 804. As such, the inventory location 804 may compare the difference to the changes in capacitance in order to identify a change in capacitance, associated with a type of item, that is similar to the difference. In some examples, the inventory location 804 may determine that the change in capacitance is similar to the difference based on the change in capacitance being substantially equal to the difference. Based on identifying that the change in capacitance is similar to the difference, the inventory location 804 may determine that the second item 814(2) includes the type of item.

For a second example, the inventory location 804 may store data representing various capacitances 810 for the inventory location 804 when different numbers of items are placed within the inventory location 804. For instance, the data may represent that the first capacitance C(1) indicates one item within the inventory location 804, the third capacitance C(3) indicates two items within the inventory location 804, and/or so forth. As such, the inventory location 804 may analyze the data to determine that the third capacitance C(3) indicates two items within the inventory location 804. The inventory location 804 may then determine that one item was placed at the inventory location 804 since there was already one item located at the inventory location 804 before the first event occurred.

Next, and as illustrated by the third illustration from the top, a second event, which occurs between a fourth time T(4) and a sixth time (6), may include a second user placing a third item 814(3) at the inventory location 804. As such, at a fifth time T(5), the inventory location 804 may receive fourth sensor data generated by the capacitive sensor(s) 802. The inventory location 804 may then analyze the fourth sensor data to determine a fourth capacitance C(4) detected by the capacitive sensor(s) 802 at the fifth time T(5). Additionally, the inventory location 804 may determine that the fourth capacitance C(4) is greater than the third capacitance C(3). As such, the inventory location 804 may determine that the second event associated with the inventory location 804 is occurring.

As such, at a sixth time T(6), the inventory location 804 may receive fifth sensor data generated by the capacitive sensor(s) 802. The inventory location 804 may then analyze the fifth sensor data to determine a fifth capacitance C(5) detected by the capacitive sensor(s) 802 at the sixth time T(6). Additionally, the inventory location 804 may determine that the fifth capacitance C(5) is less than the fourth capacitance C(4). In some examples, based on the determination, the inventory location 804 may thus determine that the second event is finished. For example, the inventory location 804 may determine that the fourth capacitance C(4) represents the second user placing his or her hand within the inventory location 804 and the sixth capacitance C(6) represents the capacitance 810 within the inventory location 804 when the second user removes the hand.

Additionally, the inventory location 804 may determine that the second event included the second user placing the third item 814(3) at the inventory location 804. In some examples, the inventory location 804 may make the determination based on the fifth capacitance C(5) being greater than the third capacitance C(3). For instance, and as discussed above, the inventory location 804 may determine that an event includes placing an item when the capacitive sensor(s) 802 detect an increase in the capacitance 810 within the inventory location 804. In some examples, the inventory location 804 may also determine the type of item and/or the number of items placed at the inventory location 804. For example, the inventory location 804 may determine a difference between the fifth capacitance C(5) and the third capacitance C(3). The inventory location 804 may then determine the type of item and/or the number of items based on the difference.

For a first example, the inventory location 804 may store the data representing the changes in capacitance that occur for various types of items that may be placed at the inventory location 804. As such, the inventory location 804 may compare the difference to the changes in capacitance in order to identify a change in capacitance, associated with a type of item, that is similar to the difference. As discussed above, the inventory location 804 may determine that the change in capacitance is similar to the difference based on the change in capacitance being substantially equal to the difference. Based on identifying that the change in capacitance is similar to the difference, the inventory location 804 may determine that the third item 814(3) includes the type of item.

For a second example, the inventory location 804 may store the data representing various capacitances 810 for the inventory location 804 when different numbers of items are placed within the inventory location 804. For instance, the data may represent that the first capacitance C(1) indicates one item within the inventory location 804, the third capacitance C(3) indicates two items within the inventory location 804, the fifth capacitance C(5) indicates three items within the inventory location 804, and/or so forth. As such, the inventory location 804 may analyze the data to determine that the fifth capacitance C(5) indicates three items within the inventory location 804. The inventory location 804 may then determine that one item was placed at the inventory location 804 since there were already two items located at the inventory location 804 before the second event occurred. Described in this invention is a single sensor and single ground per specific inventory area. In future embodiments, the sensor can be broken up as an array of sensors and a single ground to not only detect a capacitive change (when item is placed or removed as described) but to give a location of capacitive change as well (via the array—i.e. which part of the array experienced a change).

Finally, and as illustrated by the bottom illustration, a third event, which occurs between a seventh time T(7) and a ninth time (9), may include a third user removing the third item 814(3) from the inventory location 804. As such, at an eighth time T(8), the inventory location 804 may receive sixth sensor data generated by the capacitive sensor(s) 802. The inventory location 804 may then analyze the sixth sensor data to determine a sixth capacitance C(6) detected by the capacitive sensor(s) 802 at the eighth time T(8). Additionally, the inventory location 804 may determine that the sixth capacitance C(6) is greater than the fifth capacitance C(5). As such, the inventory location 804 may determine that the third event associated with the inventory location 804 is occurring. In a preferred embodiment, we look at the momentary peaking of cap caused by hand to trigger/initiate assessment or whether items are being placed or removed As such, at a ninth time T(9), the inventory location 804 may receive seventh sensor data generated by the capacitive sensor(s) 802. The inventory location 804 may then analyze the seventh sensor data to determine a seventh capacitance C(7) detected by the capacitive sensor(s) 802 at the ninth time T(9). Additionally, the inventory location 804 may determine that the seventh capacitance C(7) is less than the sixth capacitance C(6). In some examples, based on the determination, the inventory location 804 may thus determine that the third event is finished. For example, the inventory location 804 may determine that the sixth capacitance C(6) represents the third user placing his or her hand within the inventory location 804 and the seventh capacitance C(7) represents the capacitance 810 within the inventory location 804 when the second user removes the hand.

Additionally, the inventory location 804 may determine that the third event included the third user removing the third item 814(3) from the inventory location 804. In some examples, the inventory location 804 may make the determination based on the seventh capacitance C(7) being less than the fifth capacitance C(5). For instance, the inventory location 804 may determine that an event includes removing an item when the capacitive sensor(s) 802 detect a decrease in the capacitance 810 within the inventory location 804. In some examples, the inventory location 804 may also determine the type of item and/or the number of items removed to the inventory location 804. For example, the inventory location 804 may determine a difference between the seventh capacitance C(7) and the fifth capacitance C(5). The inventory location 804 may then determine the type of item and/or the number of items based on the difference.

For a first example, the inventory location 804 may store the data representing the changes in capacitance that occur for various types of items that may be placed at the inventory location 804. As such, the inventory location 804 may compare the difference to the changes in capacitance in order to identify a change in capacitance, associated with a type of item, that is similar to the difference. As discussed above, the inventory location 804 may determine that the change in capacitance is similar to the difference based on the change in capacitance being substantially equal to the difference. Based on identifying that the change in capacitance is similar to the difference, the inventory location 804 may determine that the third item 814(3) includes the type of item.

For a second example, the inventory location 804 may store the data representing various capacitances 810 for the inventory location 804 when different numbers of items are placed within the inventory location 804. For instance, the data may represent that the first capacitance C(1) indicates one item within the inventory location 804, the third capacitance C(3) indicates two items within the inventory location 804, the fifth capacitance C(5) indicates three items within the inventory location 804, and/or so forth. As such, the inventory location 804 may analyze the data to determine that the seventh capacitance C(7), which is similar to the third capacitance C(3), indicates two items within the inventory location 804. The inventory location 804 may then determine that one item was removed at the inventory location 804 since there was already three items located at the inventory location 804 before the third event occurred.

Figure 9A:
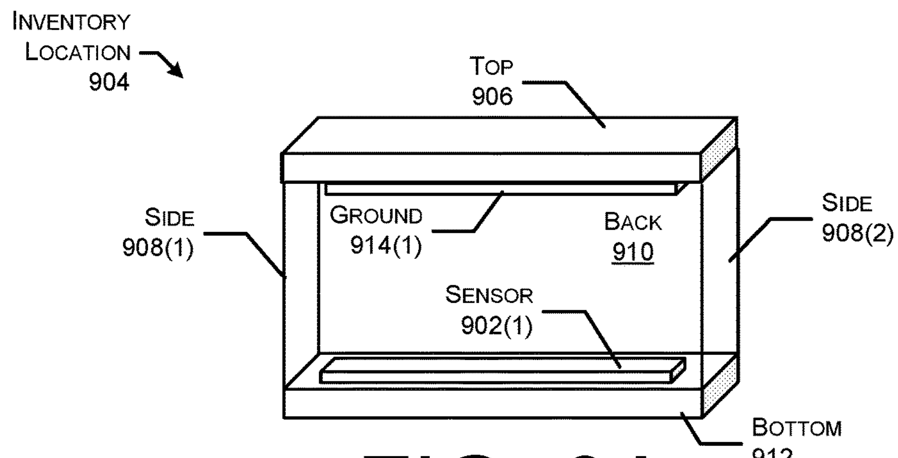
FIGS. 9A-9C illustrate examples of locations for placing capacitive sensor(s) within an inventory location, in accordance with examples of the present disclosure.
Figure 9B:
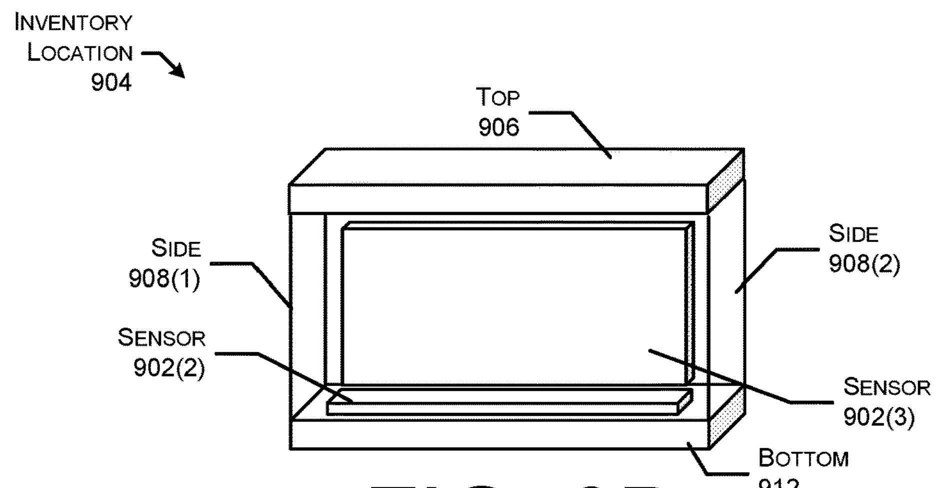
Figure 9C:
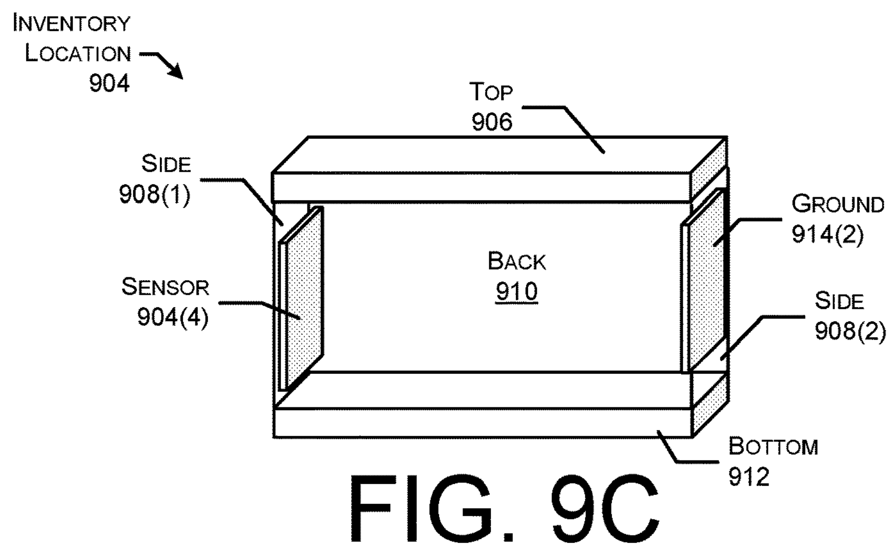

FIGS. 9A-9C illustrate examples of locations for placing capacitive sensor(s) 902(1)-(4) (also referred to singularly as "capacitive sensor 902" or plurally as "capacitive sensors 902") within an inventory location 904, in accordance with examples of the present disclosure. As shown, the inventory location 904 includes at least a top 906, a first side 908(1), a second side 908(2), a back 910, and a bottom 912. However, in other examples, the inventory location 904 may not include one or more of the top 906, the first side 908(1), the second side 908(2), the back 910, or the bottom 912.

As shown by the example of FIG. 9A, the inventory location 904 may include the capacitive sensor(s) 902 disposed on the bottom 912 of the inventory location 904 and a ground material 914(1) disposed on the top 906 of the inventory location 904. Additionally, in the example of FIG. 9B, the inventory location 904 may include first capacitive sensor(s) 902(2) disposed on the bottom 912 of the inventory location 904 and second capacitive sensor(s) 902(3) disposed on the back 910 of the inventory location 904. Furthermore, in the example of FIG. 9C, the inventory location 904 may include capacitive sensor(s) 902(4) disposed on the first side 908(1) of the inventory location 904 and a ground material 914(2) disposed on the second side 908(2) of the inventory location 904.

While these are just a few examples of where the capacitive sensors 902 and/or the ground material 914 may be located on the inventory location 904, in other examples, the capacitive sensors 902 and/or the ground material 914 may be located at additional and/or alternative locations. Additionally, in some example, similar structures for capacitive sensors and ground material may be placed within the basket 206 of the cart 202 and perform the processes described herein.

Figure 10:
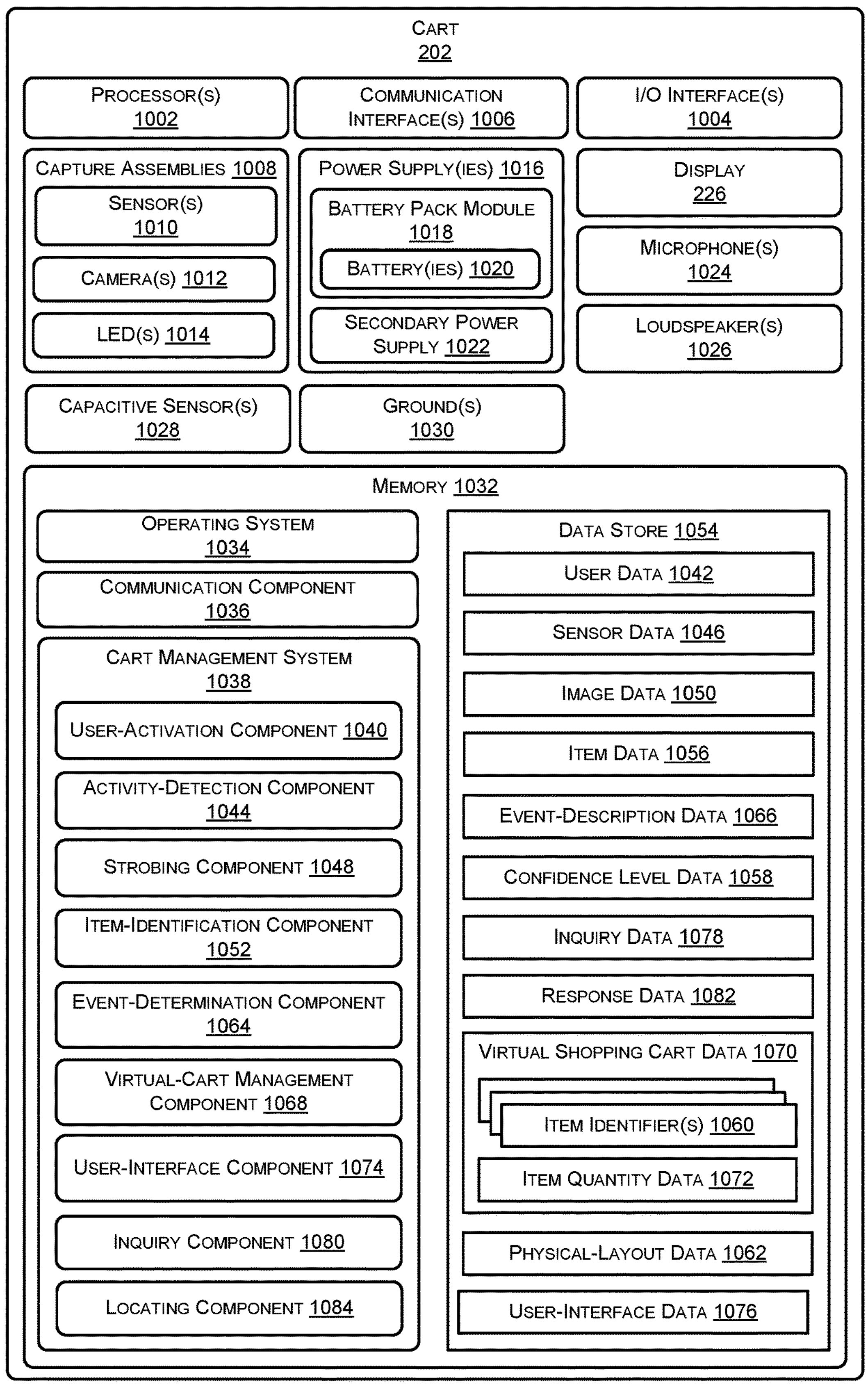
FIG. 10 illustrates example components of a cart configured to support at least a portion of the functionality of an item management system, in accordance with examples of the present disclosure.

FIG. 10 illustrates example components of the cart 202 configured to support at least a portion of the functionality of an item management system. The cart 202 may include one or more hardware processors 1002 (processors) configured to execute one or more stored instructions. The processor(s) 1002 may comprise one or more cores. The cart 202 may include one or more input/output (I/O) interface(s) 1004 to allow the processor(s) 1002 or other portions of the cart 202 to communicate with other devices. The I/O interface(s) 1004 may comprise Inter-Integrated Circuit (I2C), Serial Peripheral Interface bus (SPI), Universal Serial Bus (USB) as promulgated by the USB Implementers Forum, and so forth. The I/O interface(s) 1004 may allow the various modules/components to communicate with each other and/or control each other.

The cart 202 may also include one or more communication interfaces 1006. The communication interface(s) 1006 are configured to provide communications between the cart 202 and other devices, such as the server(s), sensors, interface devices, routers, and so forth. The communication interface(s) 1006 may include devices configured to couple to personal area networks (PANs), wired and wireless local area networks (LANs), wired and wireless wide area networks (WANs), and so forth. For example, the communication interfaces 1006 may include devices compatible with Ethernet, Wi-Fi™, and so forth. The cart 202 may also include one or more busses or other internal communications hardware or software that allow for the transfer of data between the various modules and components of the cart 202.

The cart 202 may also include the one or more capture assemblies 1008 that each include one or more sensors 1010, a camera (e.g., proximity sensor(s), weight sensor(s), etc.) 1012, and one or more LEDs 1014. The sensor(s) 1010 may comprise any type of sensor that is able to detect the presence of nearby objects without the need for physical contact (e.g., ToF sensors, PIR sensors, etc.). The cameras 1012 in each of the capture assemblies 1008 may comprise any type of camera or imaging device configured to generate image data (and/or video data), or information descriptive of a plurality of picture elements or pixels. The LED(s) 1014 may be selectively activated to emit light at any wavelength, visible or non-visible to users.

In some examples, one or more capture assemblies 1008 may additionally, or alternatively, be facing downward into the basket 206 of the cart 202. Additionally, the cart 202 may include one or more cameras 1012 that are outward facing in that generate image data representing the facility around the cart 202.

The cart 202 may include one or more power supply(ies) 1016 to provide power to the components of the cart 202, such as a battery pack module 1018, which include one or more batteries 1020. The power supply(ies) 1016 may also include a secondary (e.g., internal) power supply 1022 to allow for hot swapping of battery pack modules 1018, such as one or more capacitors, internal batteries, etc.

The cart 202 may also include the display 226 configured to display content represented by image data, such as pictures, videos, user interface elements, and/or any other image data. The display 226 may comprise any type of display 226, and may further be a touch screen to receive touch input from a user. The cart 202 may also include one or more microphones 1024 and one or more loudspeakers 1026 to facilitate a dialogue with a user, and/or to receive feedback from the user. The microphone(s) 1024 may capture sound representing the user's speech, and the loudspeaker(s) 1026 may output machine-generated words to facilitate a dialogue, prompt a user for feedback on an item and/or for other information, and/or output other alerts or notifications.

The cart 202 may also include capacitive sensor(s) 1028 and ground material 1030.

The cart 202 may include one or more memories 1032 (e.g., in an electronics box module along with the processor(s) 1002). The memory 1032 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1032 provides storage of computer-readable instructions, data structures, program modules, and other data for the operation of the cart 202. A few example functional modules are shown stored in the memory 1032, although the same functionality may alternatively be implemented in hardware, firmware, or as a system on a chip (SOC).

The memory 1032 may include at least one operating system (OS) component 1034. The OS component 1034 is configured to manage hardware resource devices such as the I/O interface(s) 1004, the communication interface(s) 1006, and provide various services to applications or components executing on the processor(s) 1002. The OS component 1034 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1032. These components may be executed as foreground applications, background tasks, daemons, and so forth. A communication component 1036 may be configured to establish communications with one or more of the sensors, one or more of the servers, or other devices. The communications may be authenticated, encrypted, and so forth.

The memory 1032 may further store a cart management system 1038. The cart management system 1038 is configured to provide the item-identifying functions (and other functions) provided by the cart 202 as described herein. For example, the cart management system 1038 may be detect items, identify items, and maintain a virtual shopping cart for a user of the cart 202.

The cart management system 1038 may include a user-activation component 1040 that performs operations for activating a shopping session using the cart 202 on behalf of a user. For instance, a user may have previously registered for a user account with an operator of the facility to utilize various automated management services provided by an operator of the facility. The user may have registered for a user account, such as by providing user data 1042, to automate payments made for items taken by the user and included a payment means (e.g., credit card, bank account number, etc.), and may have also provided an identification means in the user data 1042 to the user-activation component 1040 such that the cart 202 can recognize the user. For instance, the user may have registered to identify themselves to the cart 202 using any identification technique by the user-activation component 1040, such as by providing the user data 1042 by presenting an identification means to a camera/scanner 1012 (e.g., presenting a driver's license, presenting a facility-issued card, presenting a user identifier via a mobile phone, etc.), and/or speaking a predefined utterance that is captured by the microphone(s) 1024 (e.g., a name of the user, a predefined keyword, etc.). Once a user has identified themselves to using the user-activation component 1040, the user-activation component 1040 may open a shopping session where the cart 202 identifies and track items retrieved by the user and placed in the cart 202.

The cart management system 1038 may additionally include an activity-detection component 1044 configured to detect items (or objects) within a particular proximity to the cart 202. For example, the capacitive sensor(s) 1028 may generate sensor data 1046. The activity-detection component 1044 may then analyze the sensor data 1046 in order to determine a capacitance detected by the capacitive sensor(s) 1028. Additionally, the activity-detection component 1044 may use the capacitance to perform one or more of the processes described herein to detect the presence of a user. For example, the activity-detection component 1044 may use the capacitance to determine if the user is located proximate to the cart 202, the user is located over the perimeter of the cart 202, determine if the user is located within the opening of the cart 202, determine if the user is in contact with the cart, and/or the like.

The cart management system 1038 may further include a strobing component 1048 configured to cause the LED(s) 1014 and/or shutters of the camera(s) 1012 to strobe according to different frequencies. As noted above, the LED(s) 1014 may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 1014 to emit light in the visible spectrum. When generating image data 1050 using camera(s) 1012, motion blur may appear when capturing fact moving objects. However, the motion blur may be reduced or eliminated by exposing the camera(s) 1012 imager for a short (e.g., sub-millisecond) durations. Accordingly, the strobing component 1048 may strobe the opening and closing of shutters of the camera(s) 1012 to limit the sensor exposure duration. Additionally, the strobing component 1048 may cause the LEDs 1014 to emit/strobe light at a particular frequency.

The cart management system 1038 may also include an item-identification component 1052 configured to analyze image data 1050 to identify an item represented in the image data 1050. The image data 1050 may comprise information descriptive of a plurality of picture elements, or pixels, for one or more image frames (e.g., a still picture, multiple picture frames, video frames, etc.). The item-identification component 1052 may analyze the image data 1050 using various image processing techniques, or computer vision techniques. For instance, the item-identification component 1052 may extract a representation of an item depicted in the image data 1050 generated by at least one camera(s) 1012. The representation may include identifying text printed on the item, colors or color schemes printed in the item, determining 2-D and/or 3D shapes of the items, and/or other techniques for extract a representation of the item. In some instances, the representation of the item depicted in the image data 1050 may comprise a numeric representation, such as a feature vector or a set of feature vectors.

In some examples, a data store 1054 stored in the memory 1032 may include item data 1056, which may include representations of the items offered for acquisition at the facility. The item-identification component 1052 may compare the extracted represented of the item with the "gallery" or stored representations of the known items in the item data 1056. In some instance, the item representation may include an indication of a barcode or SKU data for the item as recognized in, or extracted from, the image data 1050. The item-identification component 1052 may determine confidence level data 1058 based on the comparisons with item representation in the item data 1056. The item-identification component 1052 may determine, and assign, confidence levels indicating how likely it is that the item represented in the image data 1050 corresponds to an item from the item gallery in the item data 1056. Based on the confidence level data 1058, the item-identification component 1052 may determine an item identifier 1060 for the item in the image data 1050 (or multiple item identifiers 1060) that corresponds to an item in the item data 1056 to which the item corresponds.

In some examples, the data store 1054 may include physical-layout data 1062 that is used by the item-identification component 1052 to determine the item. The physical-layout data 1062 may include or provide a mapping of physical locations within the physical layout of devices and objects such that the location of the cart 202 may be utilized to determine an item stored nearby. The physical-layout data 1062 may indicate the coordinates within the facility of an inventory location, items stored at that inventory location, and so forth. In examples where the cart 202 has location determining sensors (e.g., GPS, RFID, proximity, etc.), the location sensor data may be used to determine where in the store the user is. In such examples, the item-identification component 1052 may access the physical-layout data 1062 to determine if a location associated with the event is associated with a location, and confidence levels for the corresponding representations of items in the item data 1056. Continuing the example above, given the location within the facility of the event and image camera data, the physical-layout data 1062 may determine the items that may have been represented in generated images of the event.

The cart management system 1038 may further include an event-determination component 1064 to determine event-description data 1066 for the item in the image data 1050.

The event-determination component 1064 may determine if the user is adding an item to the cart 202, removing the item from the cart 202, etc., based on movement of the item and/or whether the item is shown in the image data 1050. For instance, if the item is shown as being moved downward towards the interior of the cart 202, and the user's hand then leaves the basket without the item, it can be determined that the user added the item to the cart 202. Similarly, if the user's hand moves into the cart without an item, and is depicted in the image data 1050 taking an item from the cart, the event-determination component 1064 may determine that the user removed an item from the cart 202.

The cart management system 1038 may also include a virtual-cart management component 1068 configured to manage virtual shopping cart data 1070 for the cart 202. For instance, the virtual-cart management component 1068 may utilize the item data 1056, event-description data 1066, and confidence level data 1058 to add item identifier(s) 1060 to the virtual shopping cart data 1070 for items that were added to the cart 202, remove item identifier(s) 1060 from the virtual shopping cart data 1070 for items that were removed from the cart 202, and track item quantity data 1072 indicating quantities of particular items in the cart 202.

The cart management system 1038 may further include a user-interface component 1074 configured to present user interfaces on the display 226 based on user-interface data 1076. The user interfaces may include one or more fields to present data, and/or receive touch input (or other input via a keyboard, mouse, etc.) from a user. For instance, if the item-identification component 1052 is unable to determine an item identifier 1060 for an item shown in the image data 1050, the user-interface component 1074 may receive inquiry data 1078 generated by an inquiry component 1080 to prompt a user for feedback to help identify the item, and/or other information (e.g., if multiple items were placed in the cart 202). The inquiry component 1080 may be configured to generate inquiry data 1078 based on the information needed to identify the item. For instance, the inquiry data 1078 may include a prompt to request particular feedback from the user, such as to provide input (e.g., touch input, vocal/utterance input, etc.) to identify the item, input to indicate how many items were added to the cart 202, input to indicate whether an item was removed or added, etc. In some examples, the user-interface component 1074 may present one or more images depicting items from the item data 1056 that have the highest confidence levels as corresponding tot eh item 106 in the image data 1050, but confidence levels that are not high enough to make a final decision as to the item. For instance, the user-interface component 1074 may present pictures of two different items that have high confidence levels and request that the user select or indicate the appropriate item. Additionally, or alternatively, the user-interface component 1074 may present user-interface data 1076 that prompts the user for feedback regarding whether or not the item was added to, or removed from the cart 202. The user-interface component 1074 may then receive response data 1082 representing a selection of an item.

In some examples, the cart management system 1038 may further include a locating component 1084 configured to determine locations of the cart 202 in the facility. For instance, the locating component 1084 may analyze sensor data 1046 collected by sensors of the cart 202 to determine a location. In some examples, the communication interface(s) 1006 may include network interfaces that configured the cart 202 to receive or detect wireless signals (e.g., WiFi signals, Bluetooth signals, etc.) and generate sensor data 1046 indicative of the signals. The locating component 1084 may analyze the sensor data 1046 using various techniques to identify the location of the cart 202, such as WiFi triangulation, received signal strength indicators (RSSI), and/or other methods for analyzing wireless signals to determine a location of the cart 202. In some instances, the facility may include various infrared (IR) or near-IR emitters at different locations that emit light according to frequencies, patterns, etc. that indicate the different locations in the facility. In such examples, the cart 202 may include a light sensor to generate the sensor data 1046 representing the IR or NIR and determine the location of the cart 202 in the facility. In some instances, there may be visible landmarks or markers throughout the facility that indicate a location in the facility, and the locating component 1084 may analyze image data 1050 generated by an outward facing camera 1012 to determine a location of the cart 202. As another example, there may be various radio frequency (RF) emitters positioned throughout the store, and the cart 202 may include an RF receiver to allow the locating component 1084 to perform IR beaconing to determine the location of the cart 202. The locating component 1084 may perform one, or any combination, of the above techniques to determine a location of the cart 202 in the facility and/or any other technique known in the art.

The locating component 1084 may perform various operations based on determining the location of the cart 202 within the facility. For instance, the locating component 1084 may cause user-interface data 1076 to be presented on the display 226 that includes a map of the facility and/or directions to an item for the user of the cart 202. Additionally, or alternatively, the locating component 1084 may utilize the location of the cart, the physical-layout data 1062, and/or item data 1056 and "push" user interfaces to the display 226 that indicate various location-based information, such as indications of deals for items located nearby, indications of items located nearby and on the user's shopping list, and/or other user-interface data 1076.

Figure 11:
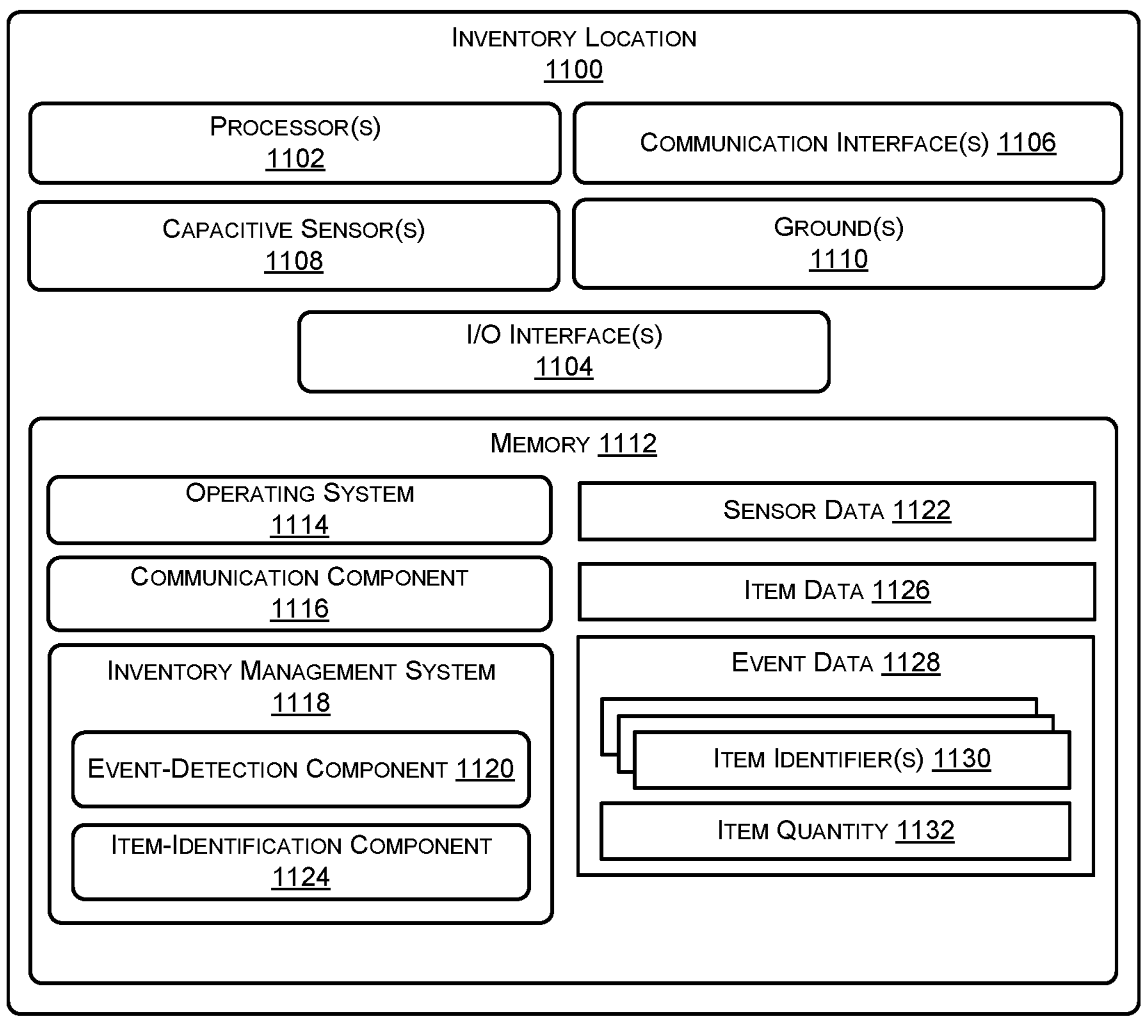
FIG. 11 illustrates example components of an inventory location, in accordance with examples of the present disclosure.

FIG. 11 illustrates example components of an inventory location 1100. The inventory location 1100 may include one or more hardware processors 1102 (processors) configured to execute one or more stored instructions. The processor(s) 1102 may comprise one or more cores. The inventory location 1100 may include one or more input/output (I/O) interface(s) 1104 to allow the processor(s) 1102 or other portions of the inventory location 1100 to communicate with other devices. The I/O interface(s) 1104 may comprise Inter-Integrated Circuit (I2C), Serial Peripheral Interface bus (SPI), Universal Serial Bus (USB) as promulgated by the USB Implementers Forum, and so forth. The I/O interface(s) 1104 may allow the various modules/components to communicate with each other and/or control each other.

The inventory location 1100 may also include one or more communication interfaces 1106. The communication interface(s) 1106 are configured to provide communications between the inventory location 1100 and other devices, such as the server(s), sensors, interface devices, routers, and so forth. The communication interface(s) 1106 may include devices configured to couple to personal area networks (PANs), wired and wireless local area networks (LANs), wired and wireless wide area networks (WANs), and so forth. For example, the communication interface(s) 1106 may include devices compatible with Ethernet, Wi-Fi™, and so forth. The inventory location 1100 may also include one or more busses or other internal communications hardware or software that allow for the transfer of data between the various modules and components of the inventory location 1100.

The inventory location 1100 may also include capacitive sensor(s) 1108 and ground material 1110. Additionally, the inventory location 1100 may include one or more memories 1112 (e.g., in an electronics box module along with the processor(s) 1102). The memory 1112 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1112 provides storage of computer-readable instructions, data structures, program modules, and other data for the operation of the inventory location 1100. A few example functional modules are shown stored in the memory 1112, although the same functionality may alternatively be implemented in hardware, firmware, or as a system on a chip (SOC).

The memory 1112 may include at least one operating system (OS) component 1114. The OS component 1114 is configured to manage hardware resource devices such as the I/O interface(s) 1104, the communication interface(s) 1106, and provide various services to applications or components executing on the processor(s) 1102. The OS component 1114 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 932. These components may be executed as foreground applications, background tasks, daemons, and so forth. A communication component 1116 may be configured to establish communications with one or more of the sensors, one or more of the servers, or other devices. The communications may be authenticated, encrypted, and so forth.

The memory 1112 may further store an inventory management system 1118. The inventory management system 1118 is configured to provide the item-identifying functions (and other functions) provided by the inventory location 1100, as described herein. For example, the inventory management system 1118 may be detect the placing of items, detect the removal of items, and/or the like.

The inventory management system 1118 may include an event-detection component 1120 configured to detect events that occur at the inventory location 1100. For example, the capacitive sensor(s) 1108 may generate sensor data 1122. The event-detection component 1120 may then analyze the sensor data 1122 in order to determine a capacitance detected by the capacitive sensor(s) 1108. Additionally, the event-detection component 1120 may use the capacitance to perform one or more of the processes described herein to detect various events. For example, the event-detection component 1120 may use the capacitance to determine if the user is reaching within the inventory location 1100, the user is removing an item from the inventory location 1100, the user is placing an item within the inventory location 1100, and/or the like.

The inventory management system 1118 may further include an item-identification component 1124 configured to determine which items were placed at and/or removed from the inventory location 1100 and/or a number of items that were placed at and/or removed from the inventory location 1100. For example, the memory 1112 may store item data 1126 representing changes in capacitance associated various items that may be placed at the inventory location 1100. The item-identification component 1124 may thus use a determined change in capacitance detected by the capacitive sensor(s) 1108, along with the item data 1126, to determine which items were placed at and/or removed from the inventory location 1100 and/or a number of items that were placed at and/or removed from the inventory location 1100.

For a first example, the item-identification component 1124 may determine that a change in capacitance detected by the capacitive sensor(s) 1108 is substantially equal to one of the changes in capacitance represented by the item data 1126. The item-identification component 1124 may then determine that the change in capacitance represented by the item data 1126 is associated with a specific type of item. As such, the item-identification component 1124 may determine that the type of item was placed at or removed from the inventory location 1124. For a second example, to determine the number of items, the item-identification component 1124 may divide a change in capacitance detected by the capacitive sensor(s) 1108 by a change in capacitance for the item as represented by the item data 1126 in order to determine the number of items.

In some examples, the item-identification component 1124 may then generate event data 1128 representing identifier(s) 1130 of the item(s) placed at or removed from the inventory location 110 during an event. Additionally, the event data 1128 may represent the quantity of items 1132 placed at or removed from the inventory location 1100. In some examples, the inventory location 1100 may then send this event data 1128 to one or more computing devices.

Figure 12A:
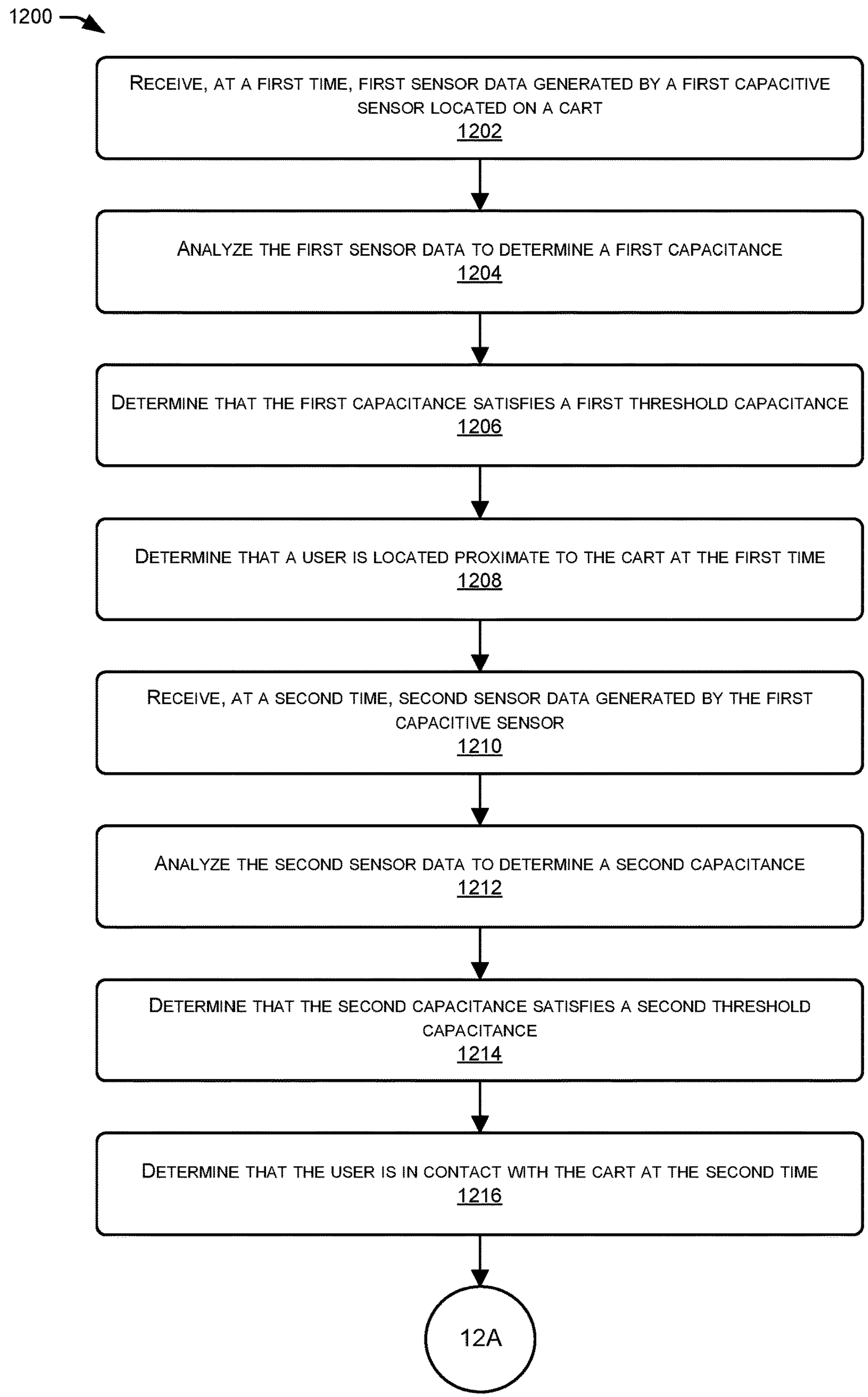
FIGS. 12A-12B are an example process for using capacitive sensor(s) of a cart to detect a presence of a user, in accordance with examples of the present disclosure.
Figure 12B:
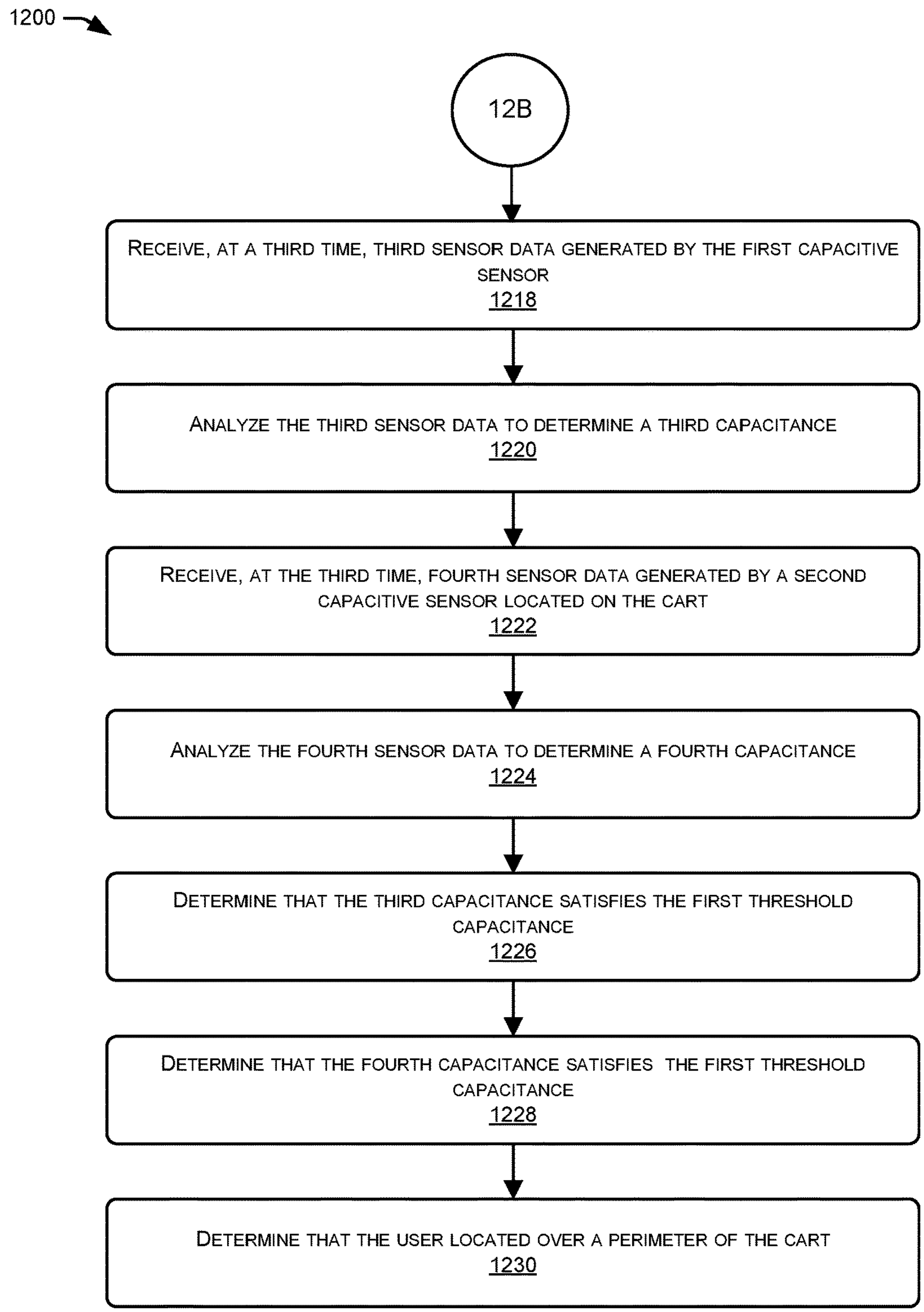
Figure 13:
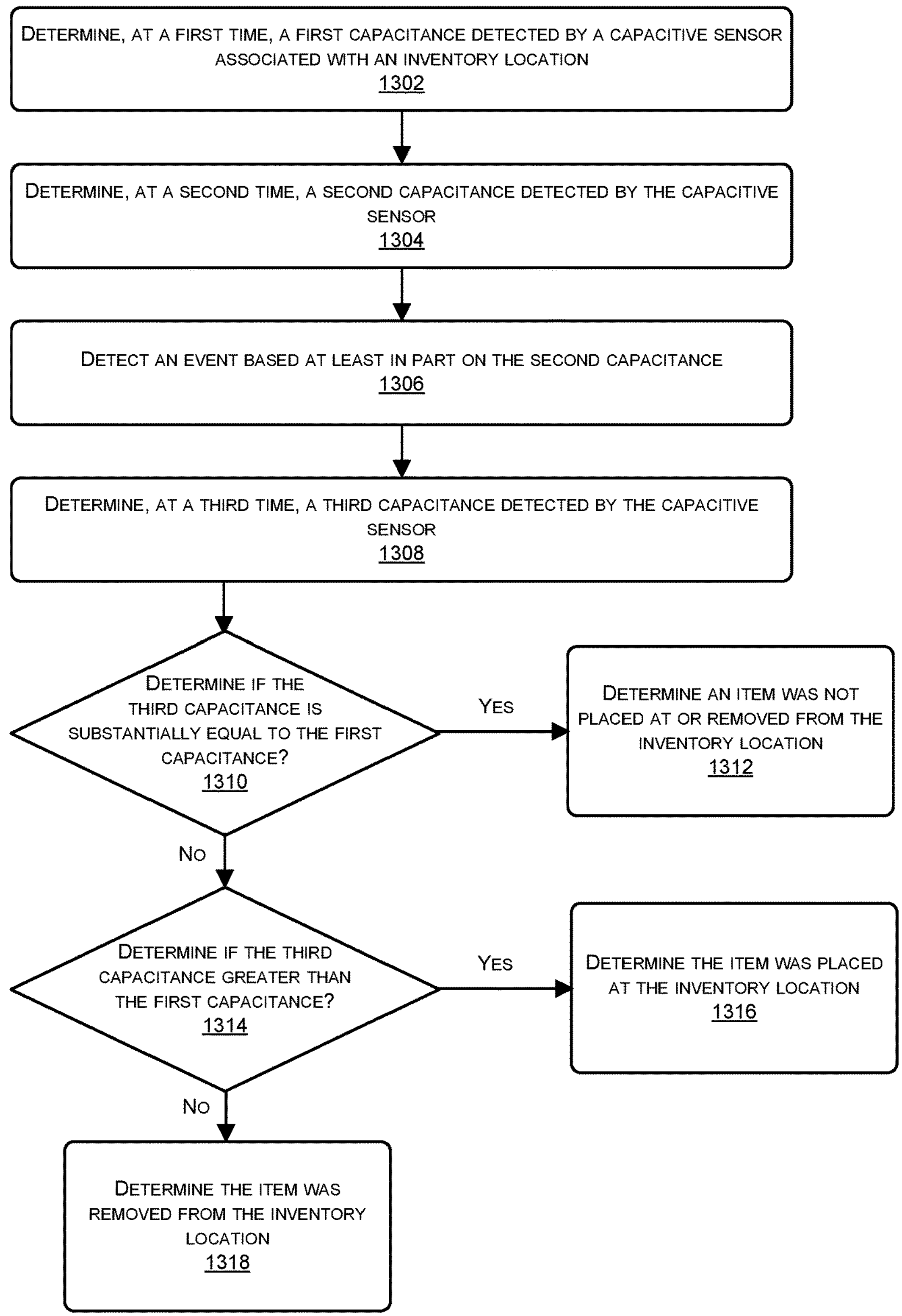
FIG. 13 is an example process for using capacitive sensor(s) of an inventory location to detect item events, in accordance with examples of the present disclosure.

FIGS. 12A-13 illustrate various processes for implementing the techniques described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 12A-12B are an example process 1200 for using capacitive sensor(s) of a cart to detect a presence of a user, in accordance with examples of the present disclosure. At 1202, the process 1200 may include receiving, at a first time, first sensor data generated by a first capacitive sensor located on a cart and at 1204, the process 1200 may include analyzing the first sensor data to determine a first capacitance. For instance, the cart 202 may generate, at the first time, the first sensor data using the first capacitive sensor. The cart 202 may then analyze the first sensor data to determine the first capacitance. In some examples, the first sensor data may represent at least a first voltage and a first charge. In such examples, the cart 202 may determine the first capacitance using the first voltage and the first charge.

At 1206, the process 1200 may include determining that the first capacitance satisfies a first threshold capacitance and at 1208, the process 1200 may include determining that a user is located proximate to the cart at the first time. For instance, the cart 202 may compare the first capacitance to the first threshold capacitance and, based on the comparison, determine that the first capacitance satisfies (e.g., is equal to or greater than) the first threshold capacitance. Based on the determination, the cart 202 may determine that the user is located proximate to the cart 202 at the first time. As described above, the user may be located proximate to the cart 202 when the user is located within a threshold distance to the cart 202.

In some examples, the cart 202 may then perform one or more first actions based on determining that the user is located proximate to the cart 202.

At 1210, the process 1200 may include receiving, at a second time, second sensor data generated by the first capacitive sensor and at 1212, the process 1200 may include analyzing the second sensor data to determine a second capacitance. For instance, the cart 202 may generate the second sensor data using the second capacitive sensor. The cart 202 may then analyze the second sensor data to determine the second capacitance. In some examples, the second sensor data may represent at least a second voltage and a second charge. In such examples, the cart 202 may determine the second capacitance using the second voltage and the second charge.

At 1214, the process 1200 may include determining that the second capacitance satisfies a second threshold capacitance and at 1216, the process 1200 may include determining that the user is in contact with the cart. For instance, the cart 202 may compare the second capacitance to the second threshold capacitance and, based on the comparison, determine that the second capacitance satisfies (e.g., is equal to or greater than) the second threshold capacitance. Based on the determination, the cart 202 may determine that the user is in contact with the cart 202 at the second time. In some examples, the cart 202 may then perform one or more second actions based on determining that the user is in contact with the cart 202.

At 1218, the process 1200 may include receiving, at a third time, third sensor data generated by the first capacitive sensor and at 1220, the process 1200 may include analyzing the third sensor data to determine a third capacitance. For instance, the cart 202 may generate, at the third time, the third sensor data using the first capacitive sensor. The cart 202 may then analyze the third sensor data to determine the third capacitance. In some examples, the third sensor data may represent at least a third voltage and a third charge. In such examples, the cart 202 may determine the third capacitance using the third voltage and the third charge.

At 1222, the process 1200 may include receiving, at the third time, fourth sensor data generated by a second capacitive sensor located on the cart and at 1224, the process 1200 may include analyzing the fourth sensor data to determine a fourth capacitance. For instance, the cart 202 may generate, at the third time, the fourth sensor data using the second capacitive sensor. The cart 202 may then analyze the fourth sensor data to determine the fourth capacitance. In some examples, the fourth sensor data may represent at least a fourth voltage and a fourth charge. In such examples, the cart 202 may determine the fourth capacitance using the fourth voltage and the fourth charge.

At 1226, the process 1200 may include determining that the third capacitance satisfies the first threshold capacitance and at 1228, the process 1200 may include determining that the fourth capacitance satisfies the first threshold capacitance. For instance, the cart 202 may compare the third capacitance to the first threshold capacitance and, based on the comparison, determine that the third capacitance satisfies (e.g., is equal to or greater than) the first threshold capacitance. As such, the cart 202 may determine that the first capacitive sensor detected the user at the third time. Additionally, the cart 202 may compare the fourth capacitance to the first threshold capacitance and, based on the comparison, determine that the fourth capacitance also satisfies (e.g., is equal to or greater than) the first threshold capacitance. As such, the cart 202 may determine that the second capacitive sensor detected the user at the third time.

At 1230, the process 1200 may include determining that the user is located over a perimeter of the cart. For instance, based on determining that the first capacitive sensor and the second capacitive sensor detected the user at the third time, the cart 202 may determine that the user is located over the perimeter of the cart 202 at the third time. In some examples, the cart 202 may then perform one or more third actions based on determining that the user is located over the perimeter.

FIG. 13 is an example process 1300 for using capacitive sensor(s) of an inventory location to detect item events, in accordance with examples of the present disclosure. At 1302, the process 1300 may include determining, at a first time, a first capacitance detected by a capacitive sensor associated with an inventory location. For instance, the inventory location 1000 may receive, at the first time, first sensor data generated by the capacitive sensor. The inventory location 1000 may then analyze the first sensor data to determine the first capacitance. Additionally, the inventory location 1000 may use the first capacitance as an initial capacitance for detecting an event.

At 1304, the process 1300 may include determining, at a second time, a second capacitance detected by the capacitive sensor and at 1306, the process 1300 may include detecting an event based at least in part on the second capacitance. For instance, the inventory location 1000 may receive, at the second time, second sensor data generated by the capacitive sensor. The inventory location 1000 may then analyze the second sensor data to determine the second capacitance. Next, the inventory location 1000 may compare the second capacitance to the first capacitance to determine whether the second capacitance is greater than the first capacitance. Based on determining that the second capacitance is substantially equal to the first capacitance, the inventory location 1000 may determine that the event is not occurring. However, and in the example of FIG. 13, based on determining that the second capacitance is greater than the first capacitance, the inventory location 1000 may determine that the event is occurring.

At 1308, the process 1300 may include determining, at a third time, a third capacitance detected by the capacitive sensor and at 1310, the process 1300 may include determining if the third capacitance is substantially equal to the first capacitance. For instance, the inventory location 1000 may receive, at the third time, third sensor data generated by the capacitive sensor. The inventory location 1000 then analyze the third sensor data to determine the third capacitance. Additionally, the inventory location 1000 may determine that the third capacitance is less than the second capacitance and as such, the inventory location 1000 may determine that the user's hand is no longer located within the inventory location 1000. Next inventory location 1000 may compare the third capacitance to the first capacitance to determine if the third capacitance is substantially equal to the first capacitance.

If, at 1310, it is determined that the third capacitance is substantially equal to the first capacitance, then at 1312, the process 1300 may include determining an item was not placed at or removed from the inventory location. For instance, if the inventory location 1000 determines that the third capacitance is substantially equal to the first capacitance, then the inventory location 1000 may determine that the user did not remove an item from or add an item to the inventory location 1000. However, if at 1310, it is determined that the third capacitance is not substantially equal to the first capacitance, then at 1314, the process 1300 may include determining if the third capacitance is greater than the first capacitance. For instance, if the inventory location 1000 determines that the third capacitance is not substantially equal to the first capacitance, then the inventory location 1000 may determine whether the third capacitance is greater than the first capacitance.

If, at 1314, it is determined that the third capacitance greater than the first capacitance, then at 1316, the process 1300 may include determining the item was placed at the inventory location. For instance, if the inventory location 1000 determines that the third capacitance is greater than the first capacitance, then the inventory location 1000 may determine that the user placed the item at the inventory location 1000. However, if at 1314, it is determined that the third capacitance is less than the first capacitance, then at 1318, the process 1300 may include determining that the item was removed from the inventory location. For instance, if the inventory location 1000 determines that the third capacitance is less than the first capacitance, then the inventory location 1000 may determine that the user removed the item from the inventory location 1000.

Figure 14:
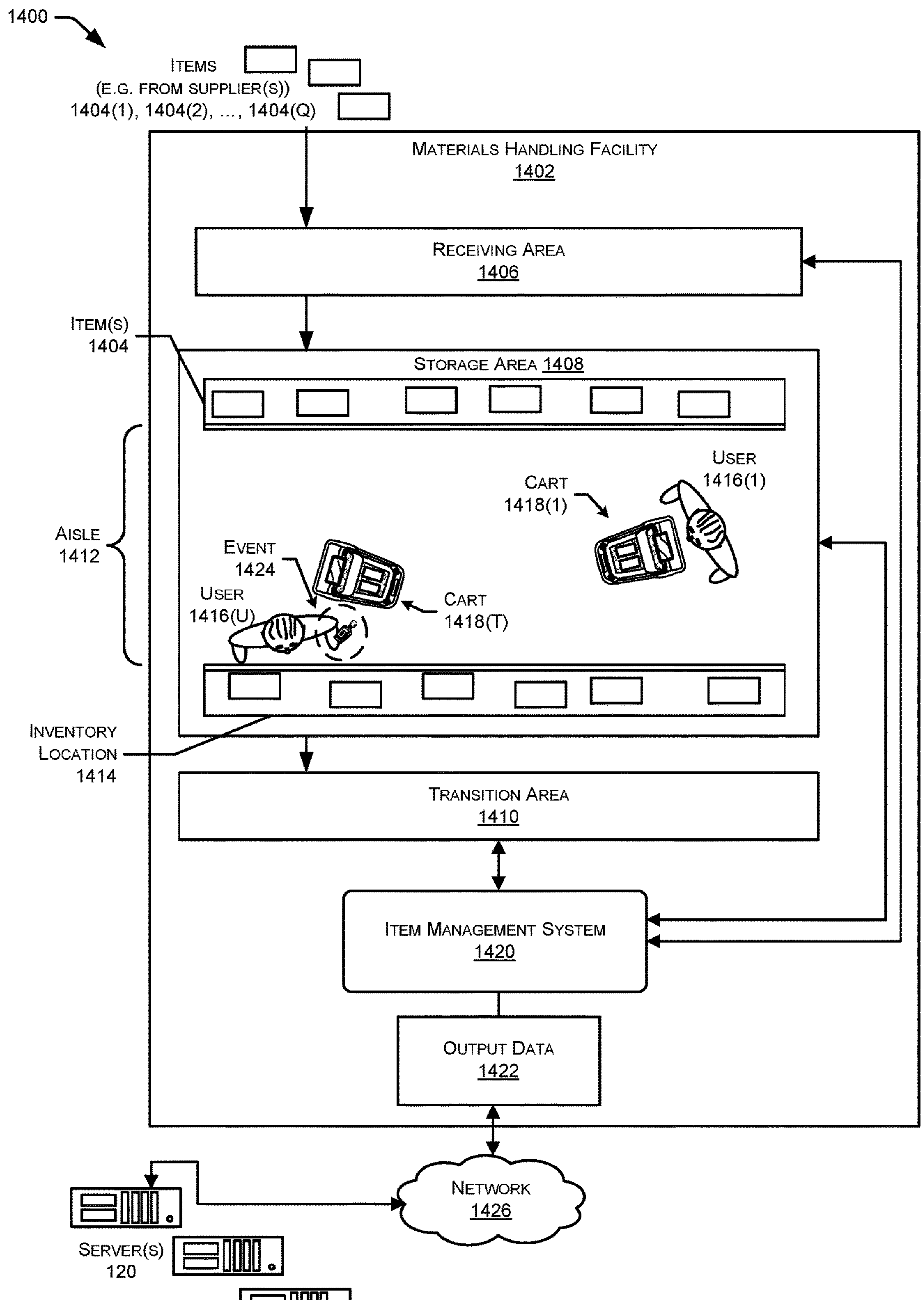
FIG. 14 is a block diagram of an example materials handling facility that includes sensors and an inventory management system configured to generate output regarding events occurring in the facility, in accordance with examples of the present disclosure.

FIG. 14 is a block diagram 1400 of an example materials handling facility 1402 that includes carts and an item management system configured to generate output regarding events occurring in the cart using sensor data. However, the following description is merely one illustrative example of an industry and environment in which the techniques described herein may be utilized.

An implementation of a materials handling facility 1402 (e.g., facility 102) configured to store and manage inventory items is illustrated in FIG. 14. A materials handling facility 1402 (facility) comprises one or more physical structures or areas within which one or more items 1404(1), 1404(2), . . . , 1404(Q) (generally denoted as 1404) may be held. As used in this disclosure, letters in parenthesis such as "(Q)" indicate an integer result. The items 1404 comprise physical goods, such as books, pharmaceuticals, repair parts, electronic gear, groceries, and so forth.

The facility 1402 may include one or more areas designated for different functions with regard to inventory handling. In this illustration, the facility 1402 includes a receiving area 1406, a storage area 1408, and a transition area 1410. The receiving area 1406 may be configured to accept items 1404, such as from suppliers, for intake into the facility 1402. For example, the receiving area 1406 may include a loading dock at which trucks or other freight conveyances unload the items 1404.

The storage area 1408 is configured to store the items 1404. The storage area 1408 may be arranged in various physical configurations. In one implementation, the storage area 1408 may include one or more aisles 1412. The aisles 1412 may be configured with, or defined by, inventory locations 1414 on one or both sides of the aisle 1412. The inventory locations 1414 may include one or more of shelves, racks, cases, cabinets, bins, floor locations, or other suitable storage mechanisms for holding or storing the items 1404. The inventory locations 1414 may be affixed to the floor or another portion of the facility's structure, or may be movable such that the arrangements of aisles 1412 may be reconfigurable. In some implementations, the inventory locations 1414 may be configured to move independently of an outside operator. For example, the inventory locations 1414 may comprise a rack with a power source and a motor, operable by a computing device to allow the rack to move from one location within the facility 1402 to another.

One or more users 1416(1), . . . , 1416(U), carts 1418(1), . . . , 1418(T) (generally denoted as 1418) or other material handling apparatus may move within the facility 1402. For example, the users 1416 may move about within the facility 1402 to pick or place the items 1404 in various inventory locations 1414, placing them on the carts 1418 for ease of transport.

An individual cart 1418 is configured to carry or otherwise transport one or more items 1404. For example, a cart 1418 may include a basket, a cart, a bag, and so forth. In other implementations, other agencies such as robots, forklifts, cranes, aerial drones, and so forth, may move about the facility 1402 picking, placing, or otherwise moving the items 1404.

One or more sensors may be configured to acquire information in the facility 1402. The sensors in the facility 1402 may include sensors fixed in the environment (e.g., ceiling-mounted cameras) or otherwise, such as sensors in the possession of users (e.g., mobile phones, tablets, etc.) or sensors mounted on the carts 1418. The sensors may include, but are not limited to, cameras, weight sensors (e.g., in the bottom of the carts 1418), radio frequency (RF) receivers, temperature sensors, humidity sensors, vibration sensors, and so forth. The sensors may be, in some examples, in or on the cart 1418 or another location in the facility 1402. In one example, the bottom of a basket of the cats 1418 may include weight sensors configured to determine a weight of the items 1404 placed thereupon.

During operation of the facility 1402, the sensors may be configured to provide information suitable for identifying the movement of items 1404 or other occurrences within the cart 1418. For example, a series of images acquired by a camera may indicate removal of an item 1404 from a particular cart 1418 by one of the users 1416 and/or placement of the item 1404 on or at least partially within one of the carts 1418.

While the storage area 1408 is depicted as having one or more aisles 1412, inventory locations 1414 storing the items 1404, sensors, and so forth, it is understood that the receiving area 1406, the transition area 1410, or other areas of the facility 1402 may be similarly equipped. Furthermore, the arrangement of the various areas within the facility 1402 is depicted functionally rather than schematically. For example, multiple different receiving areas 1406, storage areas 1408, and transition areas 1410 may be interspersed rather than segregated in the facility 1402.

The carts 1418 and/or the inventory location 1414 may include, or be coupled to, an item management system 1420 (e.g., item management system 530). The item management system 1420 is configured to identify interactions with and between users 1416, carts 1418, and/or the inventory location 1414, in one or more of the receiving area 1406, the storage area 1408, or the transition area 1410. These interactions may include one or more events 1424. For example, events 1424 may include placing of an item 1404 in a cart 1418, returning of an item 1404 from the cart 1418 to an inventory location 1414, placing an item 1404 on the inventory location 1414, removing an item 1404 from the inventory location 1414, and/or any of the other events described herein. Other events 1424 involving users 1416 may include the user 1416 providing authentication information in the facility 1402, using a computing device at the facility 1402 to authenticate identity to the item management system 1420, and so forth.

By determining the occurrence of one or more of the events 1424, the item management system 1420 may generate output data 1422. The output data 1422 comprises information about the event 1424. For example, where the event 1424 comprises an item 1404 being removed from, or placed in, a cart 1418, the output data 1422 may comprise an item identifier indicative of the particular item 1404 that was removed from, or placed in, the cart 1418, a quantity of the item 1404, a user identifier of a user that removed the item 1404, and/or other output data 1422.

The item management system 1420 may use one or more automated systems to generate the output data 1422. For example, an artificial neural network, one or more classifiers, or other automated machine learning techniques may be used to process the sensor data and/or image data from the one or more sensors to generate output data 1422. The automated systems may operate using probabilistic or non-probabilistic techniques. For example, the automated systems may use a Bayesian network. In another example, the automated systems may use support vector machines to generate the output data 1422 or the tentative results. The automated systems may generate confidence level data that provides information indicative of the accuracy or confidence that the output data 1422 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 145%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1404 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1416 may pick an item 1404(1) such as a perfume bottle that is generally cubical in shape from the inventory location 1414. Other items 1404 at nearby inventory locations 1414 may be predominately spherical. Based on the difference in shape (cube vs. sphere) from the adjacent items, and the correspondence in shape with the previously stored image of the perfume bottle item 1404(1) (cubical and cubical), the confidence level that the user 104 has picked up the perfume bottle item 1404(1) is high.

In some situations, the automated techniques may be unable to generate output data 1422 with a confidence level above a threshold result. For example, the automated techniques may be unable to distinguish which item 1404 in large a group of items a user 1416 has picked up from the inventory location 1414 and placed in the cart 1418. In other situations, it may be desirable to provide human confirmation of the event 1424 or of the accuracy of the output data 1422. For example, some items 1404 may be deemed age restricted such that they are to be handled only by users 1416 above a minimum age threshold.

In instances where human confirmation is desired, sensor data associated with an event 1424 may be processed to generate inquiry data. The inquiry data may include a subset of the sensor data associated with the event 1424. The inquiry data may also include one or more of one or more tentative results as determined by the automated techniques, or supplemental data. The subset of the sensor data may be determined using information about the one or more sensors. The subset of the sensor data may include images that may show the item 1404 being placed in, or removed from, the cart 1418. The subset of the sensor data may also omit images from other cameras that did not have that item 1404 in the field of view. The field of view may comprise a portion of the scene in the cart 1418 that the camera is able to generate sensor/image data about.

Continuing the example, the subset of the sensor data may comprise a video clip acquired by one or more cameras having a field of view that includes the item 1404. The tentative results may comprise the "best guess" as to which items 1404 may have been involved in the event 1424. For example, the tentative results may comprise results determined by the automated system that have a confidence level above a minimum threshold.

The facility 1402 may be configured to receive different kinds of items 1404 from various suppliers and to store them until a customer orders or retrieves one or more of the items 1404. A general flow of items 1404 through the facility 1402 is indicated by the arrows of FIG. 14. Specifically, as illustrated in this example, items 1404 may be received from one or more suppliers, such as manufacturers, distributors, wholesalers, and so forth, at the receiving area 1406. In various implementations, the items 1404 may include merchandise, commodities, perishables, or any suitable type of item 1404, depending on the nature of the enterprise that operates the facility 1402. The receiving of the items 1404 may comprise one or more events 1424 for which the item management system 1420 may generate output data 1422.

Upon being received from a supplier at receiving area 1406, the items 1404 may be prepared for storage. For example, items 1404 may be unpacked or otherwise rearranged. An inventory management system of the facility 1402 may include one or more software applications executing on a computer system to provide inventory management functions based on the events 1424 associated with the unpacking or rearrangement. These inventory management functions may include maintaining information indicative of the type, quantity, condition, cost, location, weight, or any other suitable parameters with respect to the items 1404. The items 1404 may be stocked, managed, or dispensed in terms of countable, individual units or multiples, such as packages, cartons, crates, pallets, or other suitable aggregations. Alternatively, some items 1404, such as bulk products, commodities, and so forth, may be stored in continuous or arbitrarily divisible amounts that may not be inherently organized into countable units. Such items 1404 may be managed in terms of measurable quantity such as units of length, area, volume, weight, time, duration, or other dimensional properties characterized by units of measurement. Generally speaking, a quantity of an item 1404 may refer to either a countable number of individual or aggregate units of an item 1404 or a measurable amount of an item 1404, as appropriate.

After arriving through the receiving area 1406, items 1404 may be stored within the storage area 1408. In some implementations, like items 1404 may be stored or displayed together in the inventory locations 1414 such as in bins, on shelves, hanging from pegboards, and so forth. In this implementation, all items 1404 of a given kind are stored in one inventory location 1414. In other implementations, like items 1404 may be stored in different inventory locations 1414. For example, to optimize retrieval of certain items 1404 having frequent turnover within a large physical facility 1402, those items 1404 may be stored in several different inventory locations 1414 to reduce congestion that might occur at a single inventory location 1414.

When a customer order specifying one or more items 1404 is received, or as a user 1416 progresses through the facility 1402, the corresponding items 1404 may be selected or "picked" from the inventory locations 1414 containing those items 1404. In various implementations, item picking may range from manual to completely automated picking. For example, in one implementation, a user 1416 may have a list of items 1404 they desire and may progress through the facility 1402 picking items 1404 from inventory locations 1414 within the storage area 1408, and placing those items 1404 into a cart 1418. In other implementations, employees of the facility 1402 may pick items 1404 using written or electronic pick lists derived from customer orders. These picked items 1404 may be placed into the cart 1418 as the employee progresses through the facility 1402. Picking may comprise one or more events 1424, such as the user 1416 in moving to the inventory location 1414, retrieval of the item 1404 from the inventory location 1414, and so forth.

After items 1404 have been picked, they may be processed at a transition area 1410. The transition area 1410 may be any designated area within the facility 1402 where items 1404 are transitioned from one location to another or from one entity to another. For example, the transition area 1410 may be a packing station within the facility 1402. When the item 1404 arrives at the transition area 1410, the items 1404 may be transitioned from the storage area 1408 to the packing station. Information about the transition may be maintained by the item management system 1420 using the output data 1422 associated with those events 1424.

In another example, if the items 1404 are departing the facility 1402 a list of the items 1404 may be used by the item management system 1420 to transition responsibility for, or custody of, the items 1404 from the facility 1402 to another entity. For example, a carrier may accept the items 1404 for transport with that carrier accepting responsibility for the items 1404 indicated in the list. In another example, a customer may purchase or rent the items 1404 and remove the items 1404 from the facility 1402.

The item management system 1420 may access or generate sensor data about the items 1404, the users 1416, the carts 1418, and so forth. The sensor data may be acquired by one or more of the sensors, data provided by other systems, and so forth. For example, the sensors may include cameras configured to acquire image data of items 1404 placed in the carts 1418. The image data may comprise still images, video, or a combination thereof. The image data may be processed by the item management system 1420 to determine an item identifier for the items 1404, a listing of items in the cart 1418 for a user 1416, and so forth. As used herein, the identity of the user of a cart 1418 may represent a unique identifier of the user (e.g., name, number associated with user, username, etc.), an identifier that distinguishes the user amongst other users being identified with the environment, or the like.

The item management system 1420, or systems coupled thereto, may be configured to identify the user 1416. In one implementation, this determination may comprise comparing sensor data with previously stored identity data. For example, the user 1416 may be identified by showing their face to a facial recognition system, by presenting a token carrying authentication credentials, providing a fingerprint, scanning a barcode or other type of unique identifier upon entering the facility, and so forth. Identity of the user 1416 may be determined before, during, or after entry to the facility 1402 and/or interaction with a cart 1418. Determination of the user's 1416 identity may comprise comparing sensor data associated with the user 1416 in the facility 1402 and/or with the cart 1418 to previously stored user data. In some examples, the output data 1422 may be transmitted over a network 1426 to server(s) 1428.

Separate instances of these programs can be executed on or distributed across any number of separate computer systems. Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A mobile cart comprising:

a frame comprising a first perimeter:

a basket coupled to the frame, the basket comprising:

a bottom defining a quadrilateral shape;

four sides protruding upward from the bottom, the bottom and the four sides defining an interior cavity of the basket to hold items;

a top having a second perimeter defining an opening to the interior cavity to receive the items placed in the interior cavity;

a first capacitive sensor located at a first side of the first perimeter;

a second capacitive sensor located at a second side of the first perimeter, the second side on an opposite side of the first perimeter from the first side;

a display coupled to the frame;

one or more processors coupled to the frame; and one or more computer-readable media storing instructions that, when executed by one or more processors, cause the one or more processors to perform operations comprising:

receiving, at a first time, first sensor data generated by the first capacitive sensor;

determining a first capacitance based at least in part on the first sensor data;

determining that the first capacitance satisfies a threshold capacitance;

based at least in part on the first capacitance satisfying the threshold capacitance, determining that a user is located proximate to the mobile cart at the first time;

causing the display to activate based at least in part on the user being located proximate to the mobile cart;

receiving, at a second time, second sensor data generated by the first capacitive sensor;

determining a second capacitance based at least in part on the second sensor data;

determining that the second capacitance satisfies the threshold capacitance;

receiving, at the second time, third sensor data generated by the second capacitive sensor;

determining a third capacitance based at least in part on the third sensor data;

determining that the third capacitance satisfies the threshold capacitance; and based at least in part on the second capacitance satisfying the threshold capacitance and the third capacitance satisfying the threshold capacitance, determining that the user is located over the first perimeter at the second time.

2. The mobile cart as recited in claim 1, the operations further comprising:

receiving, at a third time, fourth sensor data generated by the first capacitive sensor;

determining a fourth capacitance based at least in part on the fourth sensor data;

determining that the fourth capacitance satisfies an additional threshold capacitance; and based at least in part on the fourth capacitance satisfying the additional threshold capacitance, determining that the user is in contact with the frame.

3. The mobile cart as recited in claim 1, further comprising:

receiving, at a third time, fourth sensor data generated by the first capacitive sensor;

determining a fourth capacitance based at least in part on the fourth sensor data;

determining that the fourth capacitance does not satisfy the threshold capacitance;

based at least in part on the fourth capacitance not satisfying the threshold capacitance, determining that the user is no longer located proximate to the mobile cart; and causing the display to deactivate based at least in part on the user no longer being located proximate to the mobile cart.

4. A mobile apparatus comprising:

a frame comprising a first perimeter, the first perimeter including at least a first side and a second side, the second side different from the first side:

a basket coupled to the frame, the basket comprising a bottom;

one or more sides coupled to and extending up from the bottom, the bottom and the one or more sides defining a receptacle; and a top having a second perimeter that defines an opening to the receptacle; and a first capacitive sensor disposed on at least the first side of the first perimeter of the frame;

a second capacitive sensor disposed on the second side of the first perimeter of the frame; and one or more processors on-board the mobile apparatus; and one or more computer-readable media storing instructions that, when executed by the one or more processors, cause the one or more processors to perform operations comprising:

determining a first capacitance based at least in part on first sensor data from the first capacitive sensor;

determining a second capacitance based at least in part on second sensor data from the second capacitive sensor; and determining that a portion of a user is at a target position based at least in part on the first capacitance and the second capacitance.

5. The mobile apparatus as recited in claim 4, further comprising:

an insulating material disposed on the at least the portion of the first perimeter, and wherein the capacitive sensor is disposed on the insulating material.

6. The mobile apparatus as recited in claim 5, wherein:

the capacitive sensor is disposed on a first surface of the insulating material; and the mobile apparatus further comprises a ground material disposed on a second surface of the insulating material, the second surface of the insulating material being opposite to the first surface of the insulating material.

7. The mobile apparatus as recited in claim 4, further comprising:

a driven shield disposed on the at least the portion of the first perimeter, and wherein the capacitive sensor is disposed on the driven shield.

8. The mobile apparatus as recited in claim 4, wherein:

the capacitive sensor is a first capacitive sensor disposed on the first side of the first perimeter; and the mobile apparatus further comprises a second capacitive sensor disposed on the second side of the first perimeter.

9. The mobile apparatus as recited in claim 4, wherein the capacitive sensor is a first capacitive sensor, and wherein the mobile apparatus further comprises:

a handle; and a second capacitive sensor disposed on the handle.

10. The mobile apparatus as recited in claim 9, wherein the second capacitive sensor is disposed on a first portion of the handle, and wherein the mobile apparatus further comprises:

a first ground material disposed on the first portion of the handle a third capacitive sensor disposed on a second portion of the handle; and a second ground material disposed on the second portion of the handle.

11. The mobile apparatus as recited in claim 4, wherein the capacitive sensor is a first capacitive sensor and the frame is a first frame that includes a vertical member extending downward, and wherein the mobile apparatus further comprises:

a second frame coupled to the vertical member; and
a second capacitive sensor disposed on at least a portion of the second frame.

12. The mobile apparatus as recited in claim 4, wherein the capacitive sensor is a first capacitive sensor coupled to a first portion of the frame, and wherein the mobile apparatus further comprises:
a driven shield disposed on a second portion of the frame; and
a second capacitive sensor disposed on the driven shield.

13. The mobile apparatus as recited in claim 4, further comprising:
one or more processors; and
one or more computer-readable media storing instructions that, when executed by the one or more processors, cause the one or more processors to perform operations comprising:
receiving sensor data generated by the capacitive sensor;
determining a capacitance based at least in part on the sensor data; and
determining that a user is located proximate to the mobile apparatus based at least in part on the capacitance.

14. The mobile apparatus as recited in claim 4, further comprising:
one or more processors; and
one or more computer-readable media storing instructions that, when executed by the one or more processors, cause the one or more processors to perform operations comprising:
receiving first sensor data generated by the capacitive sensor;
determining a first capacitance based at least in part on the first sensor data;
determining that a user is located proximate to the mobile apparatus based at least in part on the first capacitance;
receiving second sensor data generated by the capacitive sensor;
determining a second capacitance based at least in part on the second sensor data; and
determining that the user is in contact with the first perimeter based at least in part on the second capacitance.

15. The mobile apparatus as recited in claim 4, wherein the target position is positioned over the first perimeter.

16. A mobile apparatus comprising:
a frame comprising a first perimeter;
a basket comprising:
a bottom;
one or more sides coupled to and extending up from at least a portion of the bottom, the bottom and the one or more sides defining a receptacle; and
a top having a second perimeter that defines an opening to the receptacle;
a first capacitive sensor coupled to the frame;
a second capacitive sensor coupled to the frame, wherein the first capacitive sensor and the second capacitive sensor are positioned on different sides of the basket;
one or more processors; and
one or more computer-readable media storing instructions that, when executed by the one or more processors, cause the one or more processors to perform operations comprising:
receiving first sensor data generated by the first capacitive sensor;
receiving second sensor data generated by the second capacitive sensor; and
determining, based at least in part on the first sensor data and the second sensor data, that a user is located at a target position relative to the basket .

17. The mobile apparatus as recited in claim 16, wherein:
the capacitive sensor is a first capacitive sensor disposed at a first portion of the first perimeter;
the mobile apparatus further comprises a second capacitive sensor disposed at a second portion of the first perimeter;
the operations further comprise receiving third sensor data generated by the second capacitive sensor; and
determining that the user is located at the target position comprises determining, based at least in part on the second sensor data and the third sensor data, that the user is located at least partially over the first perimeter.

18. The mobile apparatus as recited in claim 16, the operations further comprising:
receiving third sensor data generated by the capacitive sensor; and
determining, based at least in part on the third sensor data, that the user is no longer located proximate to the mobile apparatus.

19. The mobile apparatus as recited in claim 16, the operations further comprising:
causing one or more first actions to occur based at least in part on determining that the user is located at the target position; and
causing one or more second actions to occur based at least in part on determining that the user is not located at the target position.

20. The mobile apparatus as recited in claim 16, wherein:
determining that the user is located at the target position comprises determining, based at least in part on the first sensor data, that the user is located within a first threshold distance to the mobile apparatus; and
determining that the user is located at the target position comprises determining, based at least in part on the second sensor data, that the user is at least one of contacting the mobile apparatus or located over the first perimeter.

21. A mobile apparatus comprising:
a frame comprising a first side and a second side;
a basket coupled to the frame; and
a first capacitive sensor disposed on the first side of the frame;
a second capacitive sensor disposed on the second side of the frame; and
one or more processors; and
one or more computer-readable media storing instructions that, when executed by the one or more processors, cause the one or more processors to perform operations comprising:
determining a first capacitance based at least in part on first sensor data from the first capacitive sensor;
determining a second capacitance based at least in part on second sensor data from the second capacitive sensor; and
determining that a portion of a user is at a target position based at least in part on the first capacitance and the second capacitance.

22. A mobile apparatus comprising:
a frame;
a basket coupled to the frame; and
one or more capacitive sensors disposed on a first portion of the basket;

a grounding material disposed on a second portion of the basket; and one or more processors; and one or more computer-readable media storing instructions that, when executed by the one or more processors, cause the one or more processors to perform operations comprising:

determining a capacitance based at least in part on sensor data from the one or more capacitive sensors, determining that a portion of a user is at a target position based at least in part on the capacitance.

* * * * *